(12) United States Patent
Barger

(10) Patent No.: US 11,625,146 B2
(45) Date of Patent: Apr. 11, 2023

(54) DWELL CONTROL PROFESSIONAL VIEWING SPEED COMPLIANCE

(71) Applicant: MAESTRO DEVICES, LLC, Oakland, CA (US)

(72) Inventor: Andrew V. Barger, Davis, CA (US)

(73) Assignee: MAESTRO DEVICES, LLC, Oakland, CA (US)

(*) Notice: Subject to any disclaimer, the term of this patent is extended or adjusted under 35 U.S.C. 154(b) by 0 days.

(21) Appl. No.: 16/872,996

(22) Filed: May 12, 2020

(65) Prior Publication Data
US 2020/0272288 A1 Aug. 27, 2020

Related U.S. Application Data

(63) Continuation of application No. 16/230,871, filed on Dec. 21, 2018, now Pat. No. 10,691,306, which is a continuation of application No. 15/614,143, filed on Jun. 5, 2017, now Pat. No. 10,198,151, which is a continuation of application No. 14/588,300, filed on Dec. 31, 2014, now Pat. No. 9,703,451, which is a
(Continued)

(51) Int. Cl.
| | |
|---|---|
| G06T 7/00 | (2017.01) |
| G06F 3/0482 | (2013.01) |
| G06F 3/0485 | (2022.01) |
| G06F 16/22 | (2019.01) |
| G06F 16/54 | (2019.01) |
| G06F 16/28 | (2019.01) |
| G06F 3/04817 | (2022.01) |

(52) U.S. Cl.
CPC .......... *G06F 3/0482* (2013.01); *G06F 3/0485* (2013.01); *G06F 3/04817* (2013.01); *G06F 16/22* (2019.01); *G06F 16/285* (2019.01); *G06F 16/54* (2019.01)

(58) Field of Classification Search
CPC ...... G06F 3/0482; G06F 16/22; G06F 16/285; G06F 16/54; G06F 3/04817; G06F 3/0485; G06T 7/0012
See application file for complete search history.

(56) References Cited

U.S. PATENT DOCUMENTS

| | | |
|---|---|---|
| 6,574,629 B1 | 6/2003 | Cooke, Jr. et al. |
| 7,853,621 B2 | 12/2010 | Guo |

(Continued)

FOREIGN PATENT DOCUMENTS

WO PCT/US2014/065922 5/2015

OTHER PUBLICATIONS

International Search Report and Written Opinion for PCT/US2014/065922, Maestro Devices, LLC, dated May 21, 2015.
(Continued)

*Primary Examiner* — Haoshian Shih
(74) *Attorney, Agent, or Firm* — Brian S. Boyer; Syndicated Law, PC

(57) ABSTRACT

Systems are provided that enable viewing of image data using a navigation device that is strictly linked to at least one monitor, and an ancillary point-and-click device that that is free to select independent images from any monitor for display on a random selection monitor, in order to provide rapid image analyses through navigation and analysis of images in less time with less effort and less repetitive motions.

19 Claims, 16 Drawing Sheets

Related U.S. Application Data continuation of application No. 14/083,416, filed on Nov. 18, 2013, now Pat. No. 8,954,884.

(56) References Cited

U.S. PATENT DOCUMENTS

| | | | |
|---|---|---|---|
| 8,289,284 B2* | 10/2012 | Glynn | A61B 8/469 345/173 |
| 8,311,847 B2* | 11/2012 | Kotula | G16H 10/60 705/2 |
| 8,543,415 B2 | 9/2013 | Venon et al. | |
| 8,954,884 B1 | 2/2015 | Barger | |
| 9,386,261 B2 | 7/2016 | Allen et al. | |
| 9,703,451 B2 | 7/2017 | Barger | |
| 10,198,151 B2 | 2/2019 | Barger | |
| 2002/0122014 A1* | 9/2002 | Rajasingham | G02B 27/017 345/8 |
| 2003/0013951 A1 | 1/2003 | Stefanescu et al. | |
| 2004/0254763 A1* | 12/2004 | Sakai | H04L 67/12 702/184 |
| 2008/0212861 A1 | 9/2008 | Durgan et al. | |
| 2010/0063842 A1 | 3/2010 | Carroll et al. | |
| 2012/0036466 A1 | 2/2012 | Venon et al. | |
| 2013/0021369 A1 | 1/2013 | Denney et al. | |
| 2013/0139110 A1 | 5/2013 | Fang | |
| 2013/0325868 A1* | 12/2013 | Tani | G06F 16/54 707/740 |
| 2014/0229890 A1* | 8/2014 | Tokunaga | A61B 6/465 715/786 |
| 2019/0146640 A1 | 5/2019 | Barger | |

OTHER PUBLICATIONS

Alamu, F.O., et al. Developing a rubust multimedia picture archiving and communication system (PACS). Int. Journ. Computer Appl. 34(4): 12-25 (2011).

Berlin, L. Liabilty of interpreting too many radiographs. Amer. Journ. Radiol. 175(1): 17-22 (2000).

Boiselle, P.M., et al. Repetitive stress symptoms in radiology: prevalence and response to ergonomic interventions. Journ. Am. Coll. Radiol. 5(8): 919-923 (2008).

Numark Mixtrack II USB DJ Controller with Trigger Pads. [online] URL: http://www.amazon.com/Numark-Mixtrack-ll-Controller-Trigger/dp/B00CEIA1G4/ref=sr_1_1?ie=UTF8&qid=1372807706&sr=8-1&keywords=mixtrack+ii (retrived on Jul. 2, 2013).

Strickland, N.H. PACS (picture archiving and communication systems): filmless radiology. Arch. Dis. Child 83(1): 82-86 (2000).

* cited by examiner

PRIOR ART

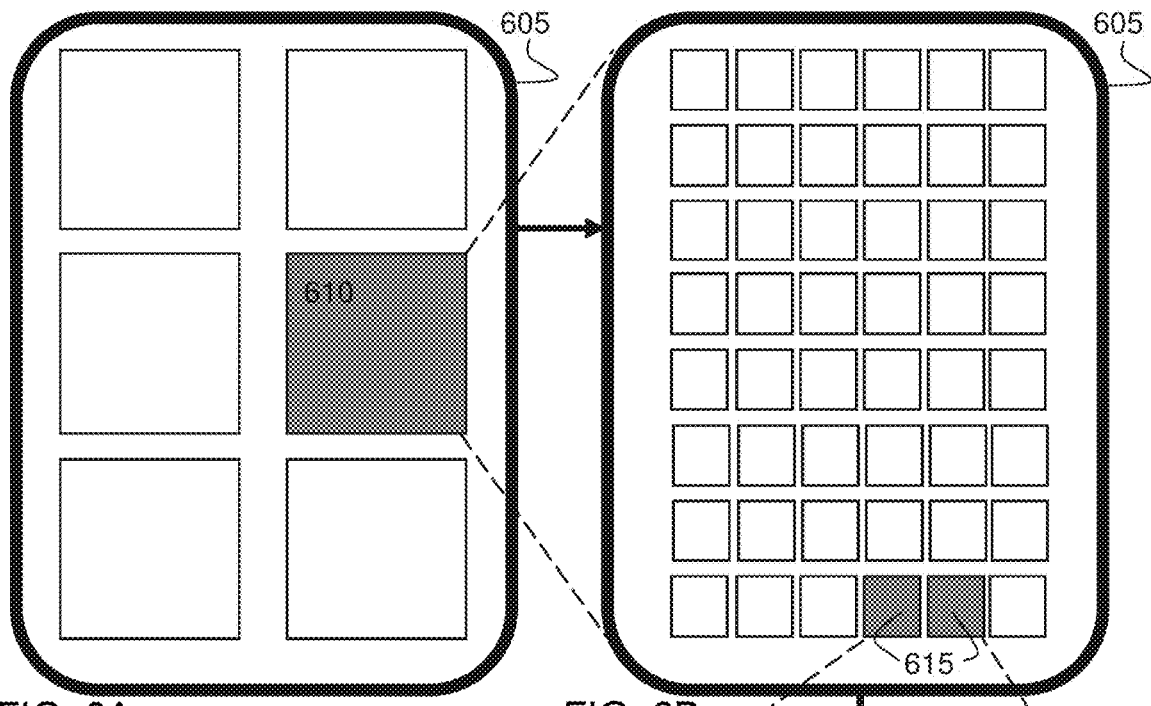
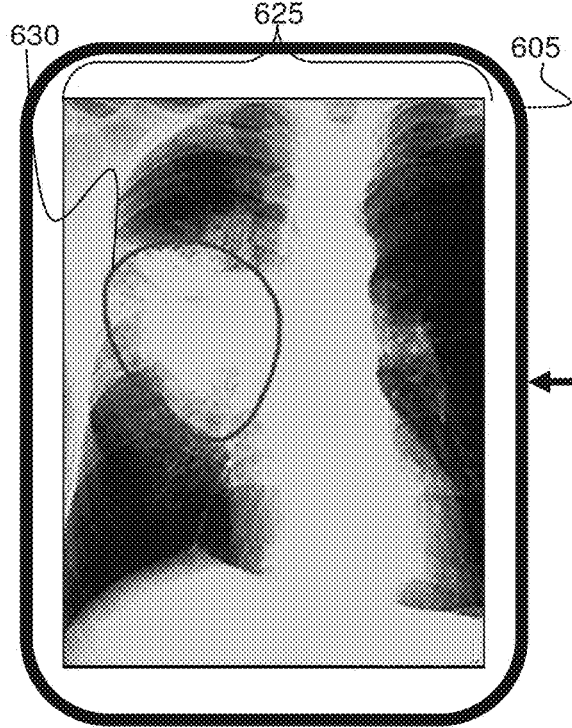
FIG. 6D
FIG. 6C

DWELL CONTROL PROFESSIONAL VIEWING SPEED COMPLIANCE

CROSS-REFERENCE TO RELATED APPLICATIONS

This application is a continuation of U.S. application Ser. No. 16/230,871, filed Dec. 21, 2018, which is a continuation of U.S. application Ser. No. 15/614,143, filed Jun. 5, 2017, now U.S. Pat. No. 10,198,151, issued Feb. 5, 2019, which is a continuation of U.S. application Ser. No. 14/588,300, filed Dec. 31, 2014, now U.S. Pat. No. 9,703,451, issued Jul. 11, 2017, which is a continuation of U.S. application Ser. No. 14/083,416, filed Nov. 18, 2013, now U.S. Pat. No. 8,954,884, issued Feb. 10, 2015, each of which is hereby incorporated herein by reference in it's entirety.

BACKGROUND

Field of the Invention

The teachings generally relate to a navigation system for viewing of an image data stack in less time with less effort and less repetitive motions, such as a data stack of medical images.

Description of the Related Art

Radiologists use cutting-edge imaging technology to examine organs and tissues to diagnose injuries and illnesses so treatment can begin. While early radiologists had only film X-rays to work with, modern radiologists have many imaging tools at their disposal including, but not limited to, X-ray radiography, ultrasound, computerized tomography (CT), magnetic resonance imaging (MRI), positron emission tomography (PET), and nuclear imaging. Advances in digital technology now allow for easy transmission of image data in the practice of "telemedicine," such that modern radiologists can practice in any location having internet connectivity. This is valuable to society, as telemedicine provides skilled, emergency consultations and collaborations after hours and around the globe. In the course of providing such services, problems arise. For example, the modern radiologist is often forced to go for long spans of time working at a rather traditional computer workstation, faced with the burden of efficiently analyzing images and delivering diagnoses using traditional computer workstation tools.

The problem is exacerbated in that advances in digital imaging have made it easy to rapidly produce and deliver numerous medical images to a radiologist, more than ever before. For example, a data-stack may have just contained axial images 20 years ago or so, whereas now the data-stack may be reconstructed in multiple imaging planes, multiple reconstruction algorithms, or three-dimensional models. As a result, 20 years ago or so, a radiologist may have averaged 20-30 images per case, whereas now, the radiologist may potentially be presented with upwards of 2000-3000 images. The radiologist's mechanical ability becomes the slow-step, resulting in slower and strenuous working conditions to sort, select, view, and interpret the increasing amounts of image data using traditional computer workstation tools that still include the point-and-click mouse as a navigation device. As such, the current navigation device limitations hinder the radiologist's ability to meet the demands of the job, which include providing uniform and reproducible analyses of large data-stacks, as rapidly and accurately as possible, for use worldwide.

These problems associated with handling and viewing the data-stacks has been addressed through systems that can format, store, and distribute the data in a universal manner. Storage and access to the various formats of the image data (imaging modalities) has been advanced through the use of picture archiving and communication systems (PACS), allowing images and reports to be transmitted digitally, eliminating the need to manually file, retrieve, or transport film jackets by offering a universal format for image storage and transfer. PACS consists of four major components: (i) imaging modalities such as X-ray plain film, computed tomography, and magnetic resonance imaging; (ii) a secured network for the transmission of confidential patient information; (iii) workstations for interpreting and reviewing images; and, (iv) a database for the storage and retrieval of images and reports. PACS has helped to break-down physical and time barriers associated with traditional film-based image retrieval, distribution, and display, but it has done nothing to address the inefficiencies of the radiologist's workstation. Currently, for example, the radiologist viewing thousands of images daily uses a computer system that is very much like a system used by the ordinary computer user that is not under anywhere near the same production expectations and time constraints. Both the radiologist and ordinary user will have a system that simply includes a processor, a database for receiving and storing images, a graphical user interface for viewing the images, and most importantly, the traditional point-and-click mouse for pointing-to, and selecting, the image data for viewing and interpreting images by group, subgroup, or individually.

Identifiable problems associated with the inefficiencies of the traditional radiologist workstation include (i) the time it takes to review a case; (ii) the ability of the radiologist to focus on the images themselves as opposed to the extra effort currently required for sorting, navigating, and selecting images; and (iii) the repetitive stress injuries that have become an expected occupational hazard to the radiologist. Reducing the time it takes to deliver an interpretation, and improving the ability to focus on making the interpretation benefits all. And, reducing the use of the traditional "point-and-click" steps inherent to the standard "mouse" control will help remove redundancies and inefficiencies at the radiologist's workstation, resulting in reduction in repetitive stress injuries in the modern radiologist. In one study of repetitive stress injuries in radiologists working in a PACS-based radiology department, for example, a total of 73 responses were received (a 68% response rate from the department). See, for example, Boiselle, P. M. J Am Coll Radiol. 5(8):919-23 (2008). Most reported working more than 8 hours per day at a personal computer or PACS monitor, and repetitive stress symptoms were reported by 58% of respondents, with prior related diagnoses of repetitive stress syndrome reported at 38%. See Id. at Abstract.

The teachings provided herein improve the radiologist's workstation to overcome the human limitations associated with the traditional methods of navigating the "data stack" of the images. One of skill will appreciate a modern workstation that (i) reduces the time it takes to review a case; (ii) improves the ability of the radiologist to focus more on the act of interpreting the data rather than navigating the data; and (iii) reduces the occurrence of repetitive stress injuries due to multiple movements currently required in the actions of sorting, navigating, selecting, viewing, and interpreting data from the images as groups, subgroups, or individual images.

SUMMARY

Image analysis systems components, devices, and methods are provided, having image navigation system for example, for rapid, efficient viewing of an image data stack. In fact, systems, components, devices, and methods are configured to provide an improved use of time and repetitive motions in the viewing of the data-stack of images, using a navigation system for viewing of an image data stack in less time with less effort and less repetitive motions. The navigation device, for example, can include: (i) an indexing state selector for selecting an independently viewable subset within the image data stack, the desired subset indexed for an efficient image selection with a single click, or other single manipulation, of the indexing state selector; and, (ii) a scrolling state selector for scrolling through the desired subset as a data series of the discrete images. And, a graphical user interface can be operably connected to the processor for viewing the plurality of sets of discrete sets of images. The systems, components, devices, and methods provided are solutions to the problem of providing rapid, efficient process for viewing a data-stack of images by implementing, for example, "point-free" steps and less repetitive motions.

The teachings generally relate to a navigation system for viewing of an image data stack in less time with less effort and less repetitive motions, such as a data stack of medical images. It should be appreciated that the navigation devices used in the systems, components, devices, and methods taught herein are configured for an improved efficiency in the use of time and movements in the viewing of the data-stack of images. The navigation device, for example, can include: (i) an indexing state selector for independently selecting a desired subset within the independently viewable subsets, the desired subset indexed for the efficient selection with a single click, or other single manipulation, of the state selector; and, (ii) a scrolling state selector for scrolling through the desired subset as a data series of the discrete images. And, as with a traditional computer system, one or more graphical user interfaces can be operably connected to the processor, for example, for viewing the plurality of sets of discrete sets of images. The systems, components, devices, and methods taught herein allow for an improved process of viewing a data-stack of images by implementing "point-free" steps and less repetitive motions.

The systems can comprise a processor; a database operably connected to the processor and on a non-transitory computer readable storage medium for storing data that is viewed by a user as a plurality of sets of discrete images; a navigation engine operably connected to the processor and on a non-transitory computer readable storage medium for parsing the plurality of sets of discrete images into independently viewable subsets of the discrete images; an indexing module operably connected to the processor and on a non-transitory computer readable storage medium for point-free indexing of each of the independently viewable subsets of the discrete images for an independent selection of each of the independently viewable subsets of the discrete images; a scrolling module operably connected to the processor and on a non-transitory computer readable storage medium for assembling each of the independently viewable subsets of the discrete images as a data series of the discrete images, the scrolling module providing for the reviewing by scrolling through the desired subset as the data series of the discrete images; a navigation device operably connected to the navigation engine for efficiently viewing the data-stack, for example, by efficiently selecting and viewing each of the independently viewable subsets of the discrete images.

In addition to accessing images quickly and efficiently for ease of review, the system can also be adapted to include the ability to modify images, enhance images, combine images, average images, subtract one image from another, change image format, and the like. As such, the systems can further comprise a transformation module operably connected to the processor and on a non-transitory computer readable storage medium for transforming the image data into a modified set of images by the user.

Likewise, the user can have the ability to select images from within a data-stack using, for example, subjective user selection, one or more software communication links, image filtering algorithms or other known methodologies, default image criteria, and the like, providing for a selection of subsets of images from the data-stack. As such, the system can further parse the images into a preferred subset of images selectable by the user. Although this functionality can be provided by any of the engines or modules taught herein, or can be built into a dedicated parsing module, in some embodiments, the transformation module is configured to provide this parsing function. Likewise, the system can include a parsing function that includes image enhancement. As such, the transformation module can be configured to alter the preferred subset of images through image enhancement as a step in the parsing.

One of skill will also appreciate the value in communicating with a second user or group of users. For example, the second user can be a second physician or other professional that can assist in the analysis or interpretation of a medical image or medical image data-stack. As such, the system can further comprise a data exchange module for sending or receiving data with a second user, or a group of users, wherein the navigation device can include a state selector that controls the sending or receiving with the second user or group of users.

One of skill will appreciate that the efficiency in indexing and scrolling through a data-stack can result in scrolling too fast and overlooking image data. As such, the teachings provided herein include systems and methods that incorporate use of a dwell module for governing the speed at which a user can scroll through images in a data-stack. Moreover, the dwell module can be configured to further control the acceleration of the scrolling.

One of skill will also appreciate that inclusion of video streams of medical data can be valuable, for example, in the diagnoses or understanding of a disease. As such, the image enhancement provided by the systems herein can include the storage, display, and/or creation of a video stream using a preferred subset of images. The navigation of images by the scroll module can include the manipulation of a video stream. For example, the systems and methods taught herein can include a video engine for producing and/or displaying a video stream, and/or the navigation of a video stream of images in the data-stack. The video engine can include a frame grabber, in some embodiments, to grab a select image from the video stream.

One of skill will also appreciate that an analysis of the images in the data-stack can be facilitated through linking specific image review steps with dictation as the images are reviewed. As such, the systems and methods taught herein can include a dictation module for prompting, receiving, and/or otherwise processing the data-stack based on criteria obtained, for example, from a dictation template. The analysis by the user can, for example, be input through voice and/or text.

One of skill will also appreciate that an analysis of the images in the data-stack can be facilitated through a systematic analysis that can be either a default systematic analysis script, or a customized systematic analysis script, either of which can have script "pathways" that are followed by the system in a manner depending on the user's prior response or responses. In some embodiments, the user can be prompted by either a default, or custom, analysis script as the images are reviewed. As such, the systems and methods taught herein can include an analysis module for prompting automatically, or upon request, a scripted analysis format for the analysis of one or more images by the user. For example, the dictation module can link one or more series of images in the data stack to a default checklist of queries selected from a group consisting of queries based on imaging technology, a disorder or disease state, region of the body, a standard of care, or a combination thereof. And, in some embodiments, the dictation module can link one or more series of images in the data stack to a custom checklist of queries selected from a group consisting of queries based on a physician's preference, a practice group's preference, a particular patient, variations in a disorder or disease state, a set of symptoms, or a combination thereof.

The "point-free" steps and less repetitive motions provide the user with methods that are much improved over state-of-the-art methods. In some embodiments, the methods include a rapid, efficient viewing of a data-stack through a graphical user interface which can comprise storing a data-stack on a database that is operably connected to a processor, the database on a non-transitory computer readable storage medium for storing the data that is viewed by a user as a plurality of sets of discrete images; parsing the plurality of sets of discrete images into independently viewable subsets of the discrete images with a navigation engine operably connected to the processor and on a non-transitory computer readable storage medium; indexing each of the independently viewable subsets of the discrete images for an independent selection of each of the independently viewable subsets of the discrete images with an indexing module operably connected to the processor and on a non-transitory computer readable storage medium to enable a point-free indexing of the subsets of the discrete images; assembling each of the independently viewable subsets of the discrete images as a data series of the discrete images for scrolling through the data series with a scrolling module operably connected to the processor and on a non-transitory computer readable storage medium; and, point-free selecting of each of the independently viewable subsets of the discrete images with a navigation device operably connected to the navigation engine. The point-free selecting can include, for example, (i) independently selecting a desired subset within the independently viewable subsets with an indexing state selector, the desired subset indexed for an efficient selection with a point-free, activation of the state selector; and, (ii) scrolling through the desired subset as a data series of the discrete images with a scrolling state selector. The viewing of the images in the data-stack can be accomplished using a graphical user interface operably connected to the processor, following which, the completing of the viewing allows the user to provide an analysis of the images in the data-stack.

One of skill will appreciate the increased efficiency provided by the systems, components, devices, and methods taught herein when compared to the current, state-of-the-art practices. For example, in some embodiments, the selecting results in completing the viewing of the data-stack in a total viewing time that is at least 10% faster than a second method using a mouse with a selection button and a scroll wheel to repetitively (i) point-and-click to select each of the independently viewable subsets on the graphical user interface, (ii) scroll through the desired subset, and (iii) point-and-click to select, both methods having an accuracy that is the same, or at least substantially the same.

The teachings provided herein use the medical field as a forum for discussing the benefits of the systems and methods presented. It should be appreciated that an image data-stack of any type can be viewed using the teachings provided herein. In some embodiments, the medical image data includes radiographs. In some embodiments, the medical image data includes magnetic resonance imaging. In some embodiments, the medical image data includes sonographs, CT images, or PET images. As such, the teachings include a system for a rapid, efficient viewing of a data-stack of medical images through a graphical user interface. Such systems can comprise a processor; a database operably connected to the processor and on a non-transitory computer readable storage medium for storing medical image data that is viewed by a user as a plurality of sets of discrete images; a navigation engine operably connected to the processor and on a non-transitory computer readable storage medium for parsing the plurality of sets of discrete images into independently viewable subsets of the discrete images; an indexing module operably connected to the processor and on a non-transitory computer readable storage medium for indexing each of the independently viewable subsets of the discrete images for an independent selection of each of the independently viewable subsets of the discrete images; a scrolling module operably connected to the processor and on a non-transitory computer readable storage medium for assembling each of the independently viewable subsets of the discrete images as a data series of the discrete images for scrolling through the desired subset as the data series of the discrete images; and, a navigation device operably connected to the navigation engine for efficiently selecting and viewing each of the independently viewable subsets of the discrete images.

To facilitate an independent selection and mapping of discrete images for a highly efficient viewing and retrieval, the method can include giving each image it's own identification means that is linked to provide a "linking mechanism" between the navigation device and the sets, subsets, and discrete images to allow for the rapid, efficient indexing between the user and images. In some embodiments, the means for identifying a discrete image, or set of images, can include any parameter that can be used to assist in parsing or otherwise filter the images. In some embodiments, the parsing or filtering can be accomplished using any of a variety of criteria, such as image location on the screen, image type, such as imaging technology; body part or object imaged, including position of the image within the body part or object, time imaged, and the like; and, the subject imaged, perhaps including details regarding the subject imaged such as name, age, sex, ethnicity, disease, genomic markers, other correlating diagnostics, and the like. As such, the indexing step can include further indexing/identifying each of the discrete images for independent selection of each of the discrete images as a single image or a custom-designed set of images. In some embodiments, the images are provided with a systematic, or random, alphanumeric identifier, bar code, or other known means of identification. In some embodiments, the identifier provides a sufficient number of permutations or variability among each image such that each image will have a unique identifier among all images. In some embodiments, each image or image subset is unique to all images in the image database for 1 month, 6 months, 1 year, 2 years, 5 years, 10 years, 20 years, 50 years, 100 years, or for all time. In some embodiments, the image data base can be a master image storage database accessible through downstream computing systems over a computer network such as an intranet or internet. As such, the indexing state selector can be adapted to provide a rapid, efficient one-click indexing to sets, subsets, and discrete images, along with a scrolling state selector for scrolling through the sets and subsets to the discrete images, resulting in less repetitive motions by the user.

In some embodiments, the navigation device includes a scrolling platter and a series of one-click buttons corresponding to particular locations in a data-stack. In some embodiments, the navigation device includes a plurality of scrolling platters, each of which can be set to correspond to a particular set or subset of discrete images, and a plurality of series of one-click buttons, each corresponding to particular locations in the data-stack, the locations of which can be previously specified by the user. As such, in some embodiments, the navigation device includes a first scrolling platter and a first series of one-click buttons that correspond to a first graphical user interface; and, a second scrolling platter and a second series of one-click buttons that correspond to a second graphical user interface.

One of skill will appreciate that the use of repetitive point-and-click motions are laborious, and that the teachings set-forth herein provide improved efficiencies through at least the direct selection of sets, subsets, and discrete images, resulting in lower repetitions of movements and, namely, the elimination of the need to point-and-click on the graphical user interface. Situations in which the user is frequently switching between two or more data-stacks can be of particular use, for example, as the ability of the scrolling selector, or plurality of scrolling selectors, to retain an association with a particular image subset can be of great importance to reduce the number of repetitive motions required to review the images.

BRIEF DESCRIPTION OF THE DRAWINGS

FIGS. 6A-6D illustrate a "point-and-click-free" process of viewing images in a data-stack from the perspective of a user of the systems taught herein, according to some embodiments.

DETAILED DESCRIPTION

A navigation system is provided for rapid, efficient viewing of an image data stack through a graphical user interface, such as a data stack of medical images, the navigation system adapted for viewing the image data stack in less time with less effort and less repetitive motions. It should be appreciated that the navigation devices used in the systems, components, devices, and methods taught herein are configured for an improved efficiency in the use of time and repetitive movements in the viewing of the data-stack of images. The navigation device, for example, can include: (i) an indexing state selector for independently selecting a desired subset within the independently viewable subsets, the desired subset indexed for the efficient selection with a single click, or other single manipulation, of the state selector; and, (ii) a scrolling state selector for scrolling through the desired subset as a data series of the discrete images. And, a graphical user interface can be operably connected to the processor for viewing the plurality of sets of discrete sets of images. The systems, components, devices, and methods provided herein are solutions to providing rapid, efficient process for viewing a data-stack of images by implementing, for example, "point-free" steps and less repetitive motions.

Figure 1:
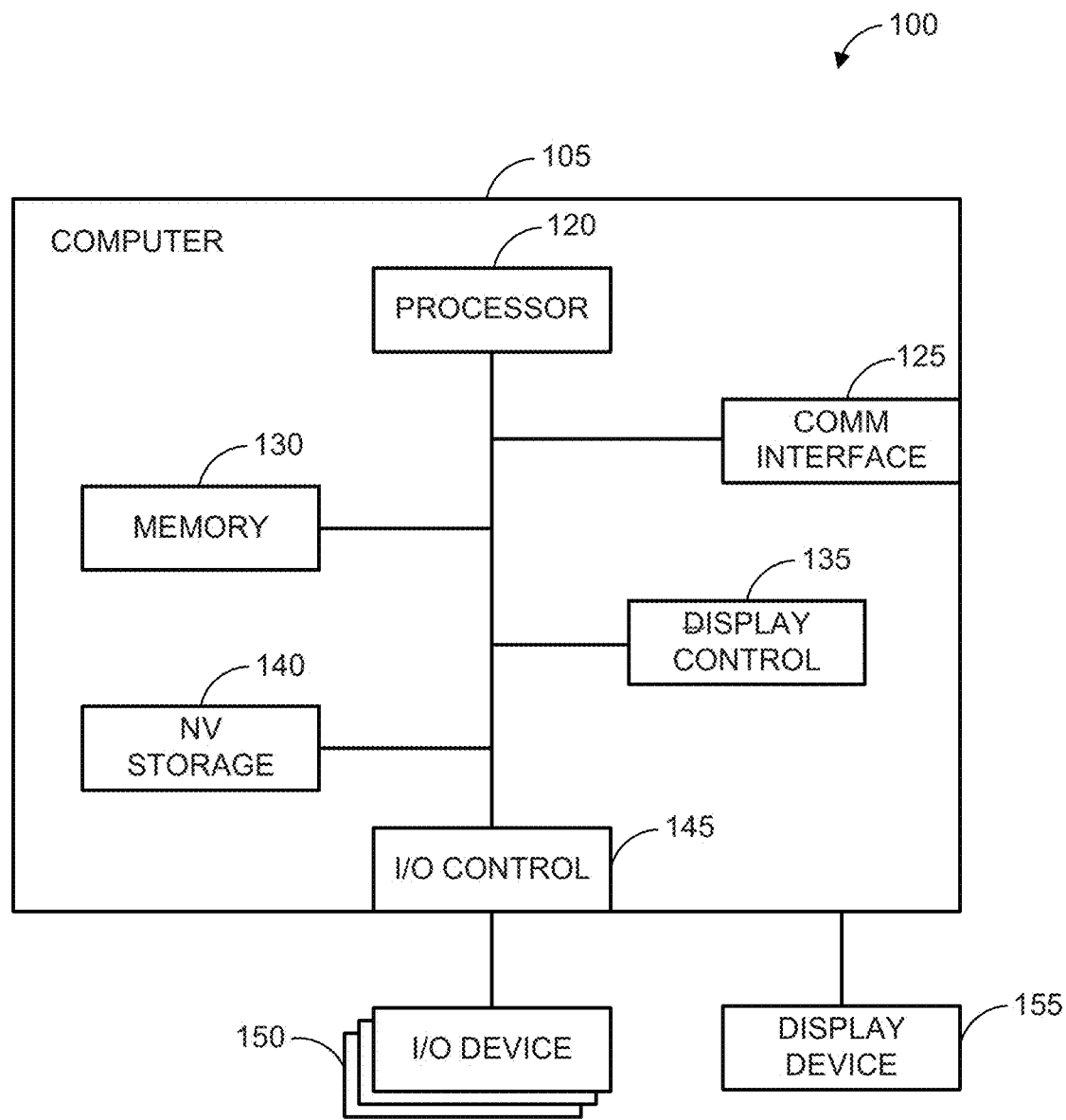
FIG. 1 shows a general technology platform for a system or method taught herein, according to some embodiments.

FIG. 1 shows a general technology platform for a system or method taught herein, according to some embodiments. The computer system 100 may be a conventional computer system and includes a computer 105, I/O devices 150, and a display device 155. The computer 105 can include a processor 120, a communications interface 125, memory 130, display controller 135, non-volatile storage 140, and I/O controller 145. The computer system 100 may be coupled to or include the I/O devices 150 and display device 155.

The computer 105 interfaces to external systems through the communications interface 125, which may include a modem or network interface. It will be appreciated that the communications interface 125 can be considered to be part of the computer system 100 or a part of the computer 105. The communications interface 125 can be an analog modem, isdn modem, cable modem, token ring interface, satellite transmission interface (e.g. "direct PC"), or other interfaces for coupling the computer system 100 to other computer systems. In a cellular telephone, or other device receiving information in the same or similar manner, this interface is typically a radio interface for communication with a cellular network and may also include some form of cabled interface for use with an immediately available personal computer. A two-way pager provides an example in which the communications interface 125 is typically a radio interface for communication with a data transmission network but may similarly include a cabled or cradled interface as well. In a personal digital assistant, the communications interface 125 typically includes a cradled or cabled interface and may also include some form of radio interface, such as a BLUETOOTH or 802.11 interface, or a cellular radio interface, for example.

The processor 120 may be, for example, any suitable processor, such as a conventional microprocessor including, but not limited to, an Intel Pentium microprocessor or Motorola power PC microprocessor, a Texas Instruments digital signal processor, or a combination of such components. The memory 130 is coupled to the processor 120 by a bus. The memory 130 can be dynamic random access memory (DRAM) and can also include static ram (SRAM). The bus couples the processor 120 to the memory 130, also to the non-volatile storage 140, to the display controller 135, and to the I/O controller 145.

The I/O devices 150 can include a keyboard, disk drives, printers, a scanner, and other input and output devices, including a mouse or other pointing device. And, the teachings provided here include a navigation device having an indexing state selector and a scrolling state selector. The display controller 135 may control in the conventional manner a display on the display device 155, which can be, for example, a cathode ray tube (CRT) or liquid crystal display (LCD), or perhaps a light-emitting-diode display (LED). The display controller 135 and the I/O controller 145 can be implemented with conventional well known technology, meaning that they may be integrated together, for example.

The non-volatile storage 140 is often a FLASH memory or read-only memory, or some combination of the two. A magnetic hard disk, an optical disk, or another form of storage for large amounts of data may also be used in some embodiments, although the form factors for such devices typically preclude installation as a permanent component in some devices. Rather, a mass storage device on another computer is typically used in conjunction with the more limited storage of some devices. Some of this data is often written, by a direct memory access process, into memory 130 during execution of software in the computer 105. One of skill in the art will immediately recognize that the terms "machine-readable medium" or "computer-readable medium" includes any type of storage device that is accessible by the processor 120 and also encompasses a carrier wave that encodes data information. Objects, methods, inline caches, cache states and other object-oriented components may be stored in the non-volatile storage 140, or written into memory 130 during execution of, for example, an object-oriented software program.

The computer system 100 is one example of many possible different architectures. For example, personal computers based on an Intel microprocessor often have multiple buses, one of which can be an I/O bus for the peripherals and one that directly connects the processor 120 and the memory 130 (often referred to as a memory bus). The buses are connected together through bridge components that perform any necessary translation due to differing bus protocols.

In addition, the computer system 100 can be controlled by operating system software which includes a file management system, such as a disk operating system, which is part of the operating system software. One example of an operating system software with its associated file management system software is the family of operating systems known as Windows CE® and Windows® from Microsoft Corporation of Redmond, Wash., and their associated file management systems. Another example of an operating system software with its associated file management system software is the MAC OS software, such as MAC OS X. Another example of operating system software with its associated file management system software is the LINUX operating system and its associated file management system. Another example of an operating system software with its associated file management system software is the PALM operating system and its associated file management system. Another example of an operating system is an ANDROID, or perhaps an iOS, operating system. The file management system is typically stored in the non-volatile storage 140 and causes the processor 120 to execute the various acts required by the operating system to input and output data and to store data in memory, including storing files on the non-volatile storage 140. Other operating systems may be provided by makers of devices, and those operating systems typically will have device-specific features which are not part of similar operating systems on similar devices. Similarly, WinCE®, PALM, IOS or ANDROID operating systems, for example, may be adapted to specific devices for specific device capabilities.

The computer system 100 may be integrated onto a single chip or set of chips in some embodiments, and can be fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Figure 2A:
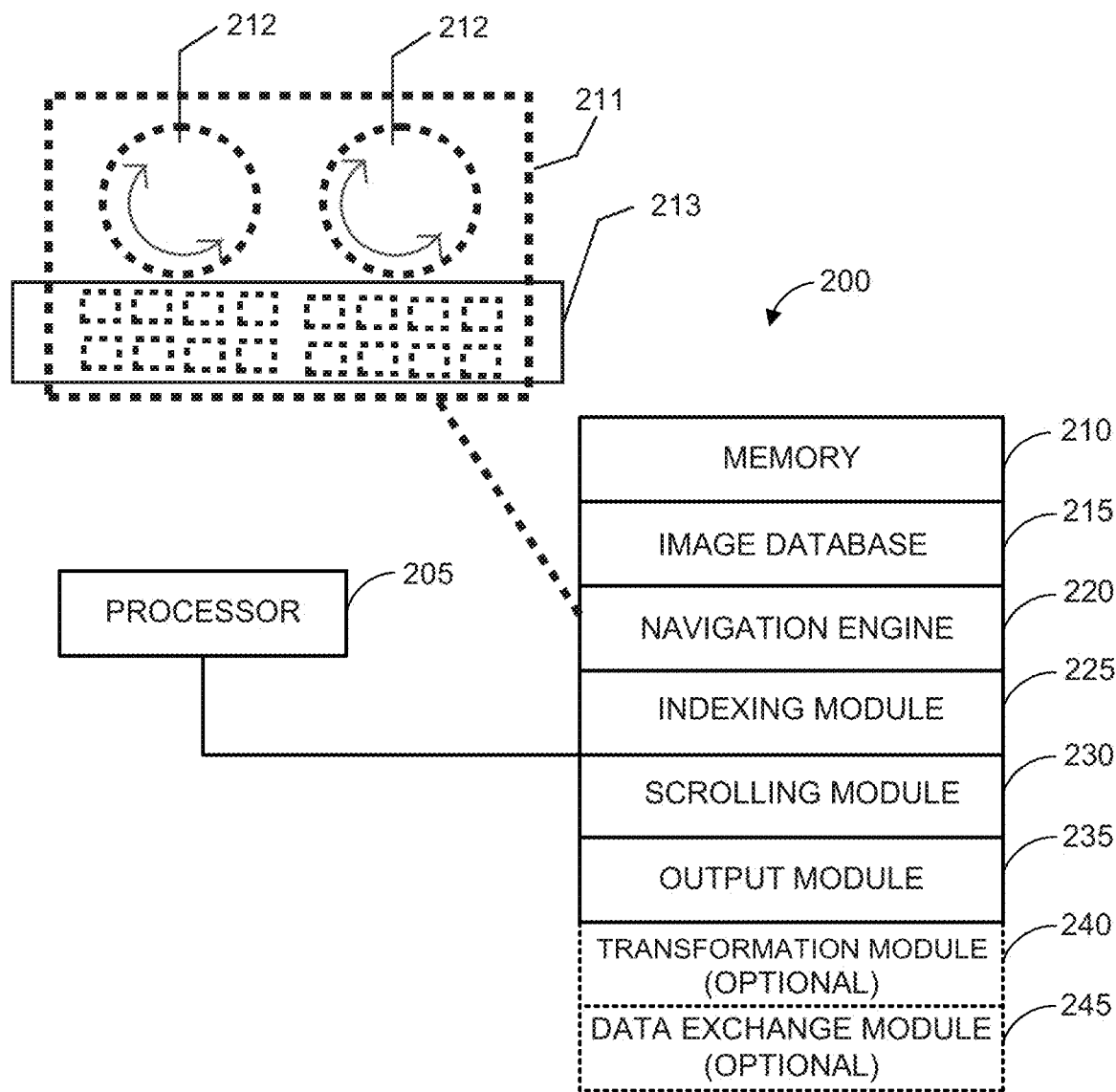
FIGS. 2A and 2B illustrate processor-memory diagrams to describe components of the system, according to some embodiments.
Figure 2B:
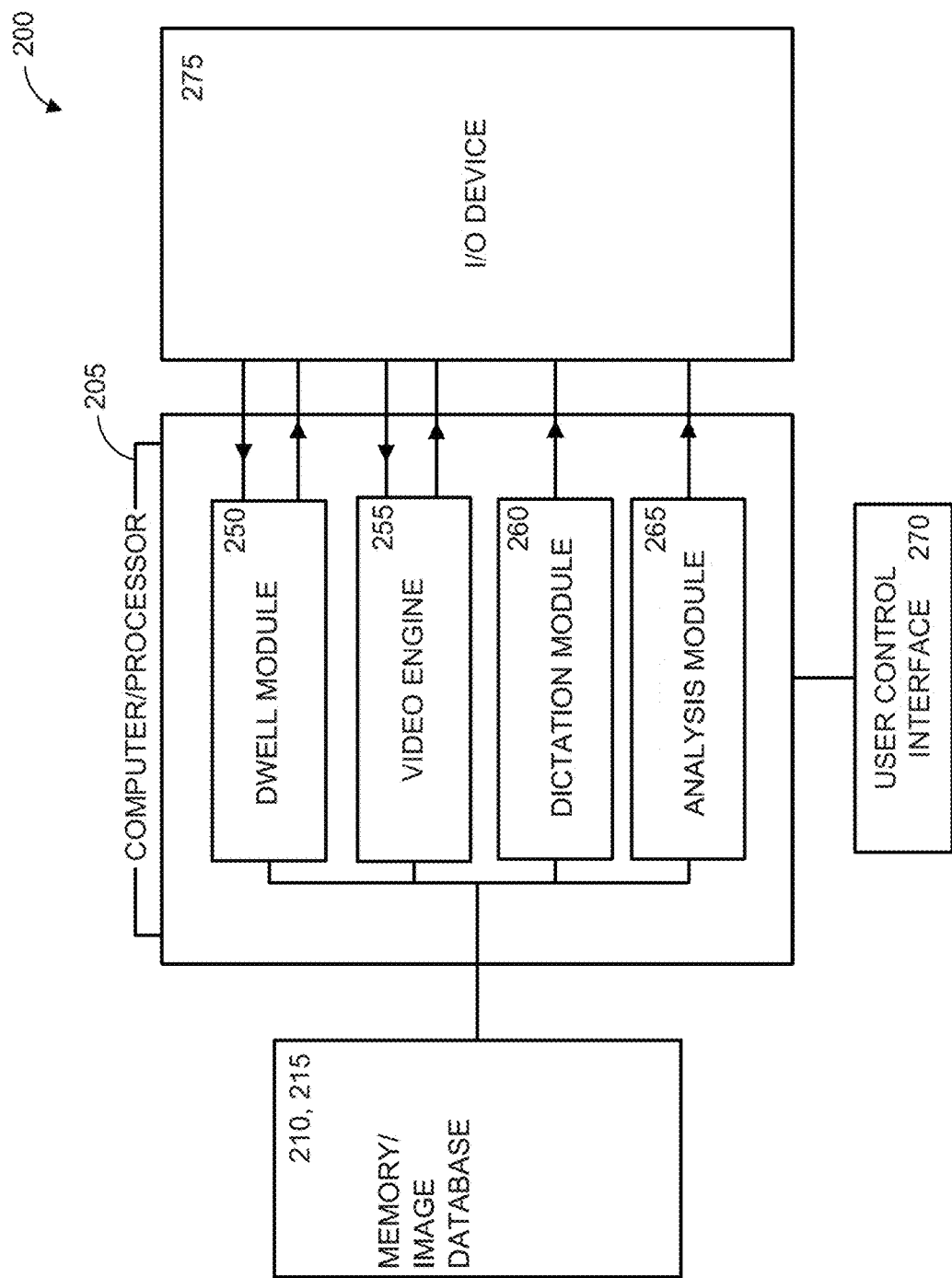

FIGS. 2A and 2B illustrate processor-memory diagrams to describe components of the system, according to some embodiments. In FIG. 2A, the system 200 shown in FIG. 2 contains a processor 205 and a memory 210 (that can include non-volatile memory), wherein the memory 210 includes an image database 215, a navigation engine 220, an indexing module 225, a scrolling module 230, an output module 235, an optional transformation module 240, and an optional data exchange module 245, which can also be a part of the output module 235. The optional data exchange module 245 embodied in a non-transitory computer readable medium is operable to exchange data with external computer readable media. The database 215 can be operably connected to the processor 205 and on a non-transitory computer readable storage medium for storing data that is viewed by a user as a plurality of sets of discrete images; the navigation engine 220 operably connected to the processor 205 and on a non-transitory computer readable storage medium for parsing the plurality of sets of discrete images into independently viewable subsets of the discrete images; the indexing module 225 operably connected to the processor 205 and on a non-transitory computer readable storage medium for point-free indexing, including location and retrieval, of each of the independently viewable subsets of the discrete images for an independent selection of each of the independently viewable subsets of the discrete images; the scrolling module 230 operably connected to the processor 205 and on a non-transitory computer readable storage medium for assembling each of the independently viewable subsets of the discrete images as a data series of the discrete images for scrolling through the desired subset as the data series of the discrete images; the navigation device 211 operably connected to the navigation engine 220 for efficiently selecting and viewing each of the independently viewable subsets of the discrete images.

The system includes an input device (not shown) operable to receive data on a non-transitory computer readable medium. Examples of input devices include a data exchange module 245 operable to interact with external data formats, voice-recognition software, a hand-held device in communication with the system including, but not limited to, a microphone, and the like, as well as a camera or other video image capture and transmission device. It should be appreciated that the system can be adapted to receive an analog or digital audio or video.

The image database 215 can be operable to store image files for access on a non-transitory computer readable storage medium. In some embodiments, the system can store original image files, copies of image files, and the like. Any image file known to one of skill in the art can be stored, including, but not limited to image files are composed of digital data that can be rasterized for use on a computer display or printer. An image file format may be used to store data such as, for example, in uncompressed, compressed, or vector formats. In some embodiments, the system can receive, store, and provide access to any of a variety of image formats through a data exchange module, as discussed above.

In some embodiments, the images can be in a DICOM format, such as that used in the picture archiving and communication systems (PACS) used in modern medical imaging technology. The universal format for PACS image storage and transfer is DICOM (Digital Imaging and Communications in Medicine). Non-image data, such as scanned documents, may be incorporated using consumer industry standard formats like PDF (Portable Document Format), once encapsulated in DICOM.

Other formats include raster, HDR raster, vector, compound, and stereo video. Examples of raster formats include, but are not limited to, JPEG/JFIF, JPEG 2000, Exif, TIFF, RAW, GIF, BMP, PNG, PPM, PGM, PBM, PNM and PFM, PAM, and WEBP. Examples of HDR raster formats include, but are not limited to, RGBE (Radiance HDR), IFF-RGFX. Other image file formats of the raster type include, but are not limited to, JPEG XR, TGA (TARGA), ILBM (IFF-style format for up to 32 bit in planar representation, plus optional 64 bit extensions), DEEP (IFF-style format used by TVPaint), IMG (Graphical Environment Manager image file; planar, run-length encoded), PCX (Personal Computer eXchange), ECW (Enhanced Compression Wavelet), IMG (ERDAS IMAGINE Image), SID (multiresolution seamless image database, MrSID), CD5 (Chasys Draw Image), FITS (Flexible Image Transport System), PGF (Progressive Graphics File), XCF (eXperimental Computing Facility format, native GIMP format), PSD (Adobe PhotoShop Document), PSP (Corel Paint Shop Pro), VICAR file format (NASA/JPL image transport format). Examples of vector formats include, but are not limited to, CGM, Gerber File Format (RS-274X), SVG. Other 2D vector formats include but are not limited to, AI (Adobe Illustrator), CDR (CorelDRAW), DrawingML, GEM metafiles (interpreted and written by the Graphical Environment Manager VDI subsystem), Graphics Layout Engine, HPGL, HVIF (Haiku Vector Icon Format), MathML, MetaPost, Myv vector format, NAPLPS (North American Presentation Layer Protocol Syntax), ODG (OpenDocument Graphics), !DRAW, POV-Ray markup language, PPT (Microsoft PowerPoint), Precision Graphics Markup Language, PSTricks and PGF/TikZ, ReGIS, Remote imaging protocol, VML (Vector Markup Language), WMF/EMF (Windows Metafile/Enhanced Metafile), and Xar. 3D vector formats include, but are not limited to, AI (Adobe Illustrator), CDR (CorelDRAW), DrawingML, GEM metafiles, Graphics Layout Engine, HPGL, HVIF (Haiku Vector Icon Format), MathML, MetaPost, Myv vector format, NAPLPS (North American Presentation Layer Protocol Syntax), ODG (OpenDocument Graphics), !DRAW, POV-Ray markup language, PPT (Microsoft PowerPoint), Precision Graphics Markup Language, PSTricks and PGF/TikZ, ReGIS, Remote imaging protocol, VML (Vector Markup Language), WMF/EMF (Windows Metafile/Enhanced Metafile), Xar format, XPS (XML Paper Specification). Examples of compound formats include but are not limited to, AI (Adobe Illustrator), CDR (CorelDRAW), DrawingML, GEM metafiles, Graphics Layout Engine, HPGL, HVIF (Haiku Vector Icon Format), MathML, MetaPost, Myv vector format, NAPLPS (North American Presentation Layer Protocol Syntax), ODG (OpenDocument Graphics), !DRAW, POV-Ray markup language, PPT (Microsoft PowerPoint), Precision Graphics Markup Language, PSTricks and PGF/TikZ, ReGIS, Remote imaging protocol, VML (Vector Markup Language), WMF/EMF (Windows Metafile/Enhanced Metafile), Xar format, XPS (XML Paper Specification). Examples of stereo formats include, but are not limited to, MPO, PNS, and JPS.

One of skill will appreciate that the teachings provided herein are not limited to particular file formats, and that any audio or video format known to one of skill in the art can be used in some embodiments. For example, the audio file can comprise a format that supports one audio codec and, in some embodiments, the audio file comprises a format that supports multiple codecs. In some embodiments the audio file comprises an uncompressed audio format such as, for example, WAV, AIFF, and AU. In some embodiments, the audio file format comprises lossless compression such as, FLAC, Monkey's Audio having file extension APE, WavPack having file extension WV, Shorten, Tom's lossless Audio Kompressor (TAK), TTA, ATRAC Advanced Lossless, Apple Lossless, and lossless WINDOWS Media Audio (WMA). In some embodiments, the audio file format comprises lossy compression, such as MP3, Vorbis, Musepack, ATRAC, lossy WINDOWS Media Audio (WMA) and AAC.

In some embodiments, the audio format is an uncompressed PCM audio format, as a ".wav" for a WINDOWS computer readable media, or as a ".aiff" as a MAC OS computer readable media. In some embodiments a Broadcast Wave Format (BWF) can be used, allowing metadata to be stored in the file. In some embodiments, the audio format is a lossless audio format, such as FLAC, WayPack, Monkey's Audio, ALAC/Apple Lossless. In some embodiments, the lossless audio format provides a compression ratio of about 2:1. In some embodiments, the audio format is a free-and-open format, such as way, ogg, mpc, flac, aiff, raw, au, or mid, for example. In some embodiments, the audio format is an open file format, such as gsm, dct, vox, aac, mp4/m4a, or mmf. In some embodiments the audio format is a proprietary format, such as mp3, wma, atrac, ra, ram, dss, msv, dvg, IVS, m4p, iklax, mxp4, and the like.

In addition, the system can include an output module 235 embodied in a non-transitory computer readable medium, wherein the output module 235 is operable to transmit data to an output device, which can be a graphical user interface, or video display, which can optionally be supported by one or more other output devices by the output module 235. The output device can be operable to provide audio data to the user, wherein the audio data can be used to assist the user in viewing image data.

In some embodiments, the input device comprises a microphone and/or camera and, in some embodiments, the output module 235 transmits an image, sets of images, or a video stream to a graphical user interface. In some embodiments, the output device comprises a speaker, a graphical user interface, or both a speaker and a graphical user interface, for example.

One of skill will appreciate that time stamping of data samples can also be used to assemble data streams. In some embodiments, an audio data stream can be used with a graphical display. And, the audio data can have a variety of formats known to one of skill.

In addition to accessing images quickly and efficiently for ease of review, the system can also be adapted to include the ability to modify images, enhance images, combine images, average images, subtract one image from another, change image format, and the like. As such, the systems can further comprise the transformation module 240 operably connected to the processor and on a non-transitory computer readable storage medium for transforming the image data into a modified set of images by the user. Likewise, the user can have the ability to select images from within a data-stack using, for example, subjective user selection, one or more software image filtering algorithms or other known methodologies, default image criteria, and the like. As such, the system can further parse the images into a preferred subset of images by the user. Although this functionality can be provided by any of the engines or modules taught herein, or can be built into a dedicated parsing module, in some embodiments, the transformation module 240 is configured to provide this parsing function. Likewise, the system can include a parsing function that includes image enhancement. As such, the transformation module 240 can be configured to alter the preferred subset of images through image enhancement as a step in the parsing.

One of skill will also appreciate the value in communicating with a second user. For example, the second user can be a second physician or other professional that can assist in the analysis or interpretation of an image or image data-stack. As such, the system can further comprise a data exchange module 245 for sending or receiving data with a second user, wherein the navigation device can include a state selector that controls the sending or receiving with the second user. The data exchange module 245 is embodied in a non-transitory computer readable medium and is operable to exchange data with external computer readable media. The data exchange module can, for example, serve as a messaging module operable to allow users to communicate with other users having like subject-profiles, or others users in a profile independent manner, merely upon election of the user. The users can email one another, post blogs, or have instant messaging capability for real-time communications. In some embodiments, the users have video and audio capability in the communications, wherein the system implements data streaming methods known to those of skill in the art. In some embodiments, the system is contained in a hand-held device; operable to function as a particular machine or apparatus having the additional function of telecommunications, word processing, or gaming; or operable to function as a particular machine or apparatus not having other substantial functions.

FIG. 2B shows some additional features. For example, one of skill will appreciate that the efficiency in indexing and scrolling through a data-stack can result in scrolling too fast and overlooking image data. As such, the teachings provided herein can help ensure that does not occur. In some embodiments, the systems, components, devices, and methods provided herein govern the speed at which images are reviewed while still providing rapid scrolling to the region of interest. As such, the teachings provided herein include systems and methods that incorporate use of a dwell module 250 for governing the speed at which a user can scroll through images in a data-stack. Moreover, the dwell module 250 can be configured to further control the acceleration of the scrolling.

Moreover, one of skill will also appreciate that production of video streams of medical data can be valuable, for example, in the diagnoses or understanding of a disease. As such, the image enhancement provided by the systems herein can include the storage, display, and or creation of a video stream using the preferred subset of images. For example, the systems and methods taught herein can include a video engine 255 for producing and/or displaying a video stream of images in the data-stack.

One of skill will also appreciate that an analysis of the images in the data-stack can be facilitated through dictation, providing voice commands, as the images are reviewed. As such, the systems and methods taught herein can include a dictation module 260 for prompting, receiving, and/or otherwise processing the analysis by the user as input through voice and/or text commands.

One of skill will also appreciate that an analysis of the images in the data-stack can be facilitated through a systematic analysis that can be either a default systematic analysis script, or a customized systematic analysis script, either of which can have script "pathways" that are followed by the system in a manner depending on the user's prior response or responses. In some embodiments, the user can be prompted by either a default, or custom, analysis script as the images are reviewed. As such, the systems and methods taught herein can include an analysis module 265 for prompting automatically, or upon request, a scripted analysis format for the analysis of one or more images by the user. The scripted analysis can be, for example, a link of series of images to a checklist of queries regarding that "type" of image set. In some embodiments, the "type" of image set can be (i) imaging technology, (ii) disease state, (iii) region of the body, or any combination thereof. In some embodiments, the queries can be default queries, customized queries designed for a particular physician, practice group, geographical practice area, standard of care, patient, disorder, or disease state, or a combination thereof. The dictation module, for example, can link one or more series of images in the data stack to a default checklist of queries selected from a group consisting of queries based on imaging technology, a disorder or disease state, region of the body, a standard of care, or a combination thereof. In some embodiments, the dictation module can link one or more series of images in the data stack to a custom checklist of queries selected from a group consisting of queries based on a physician's preference, a practice group's preference, a particular patient, variations in a disorder or disease state, a set of symptoms, or a combination thereof.

The user control interface 270 is operably connected to the processor and can include a non-transitory computer readable medium for modifying a user control, such as the navigation device 211,275, namely the scrolling state selector 212 and/or the indexing state selector 213. The user control interface 270 can modify, for example, the speed and/or acceleration of the scrolling, the linkage between the set of images, subset of images, or discrete images and particular graphical user interface displaying the set of images, subset of images, or discrete images that are controlled by that particular navigation device 211,275. Other I/O devices that may be controlled by the user control interface can include a keyboard, disk drives, printers, a scanner, and other input and output devices, including a mouse or other pointing device and one or more monitors (graphical user interfaces.)

The systems taught herein can be practiced with a variety of system configurations, including personal computers, multiprocessor systems, microprocessor-based or programmable consumer electronics, network PCs, minicomputers, mainframe computers, and the like. The teachings provided herein can also be practiced in distributed computing environments where tasks are performed by remote processing devices that are linked through a communications network. As such, in some embodiments, the system further comprises an external computer connection through the data exchange module 245 and a browser program module (not shown). The browser program module (not shown) can be operable to access external data as a part of the data exchange module 245.

Figure 3:
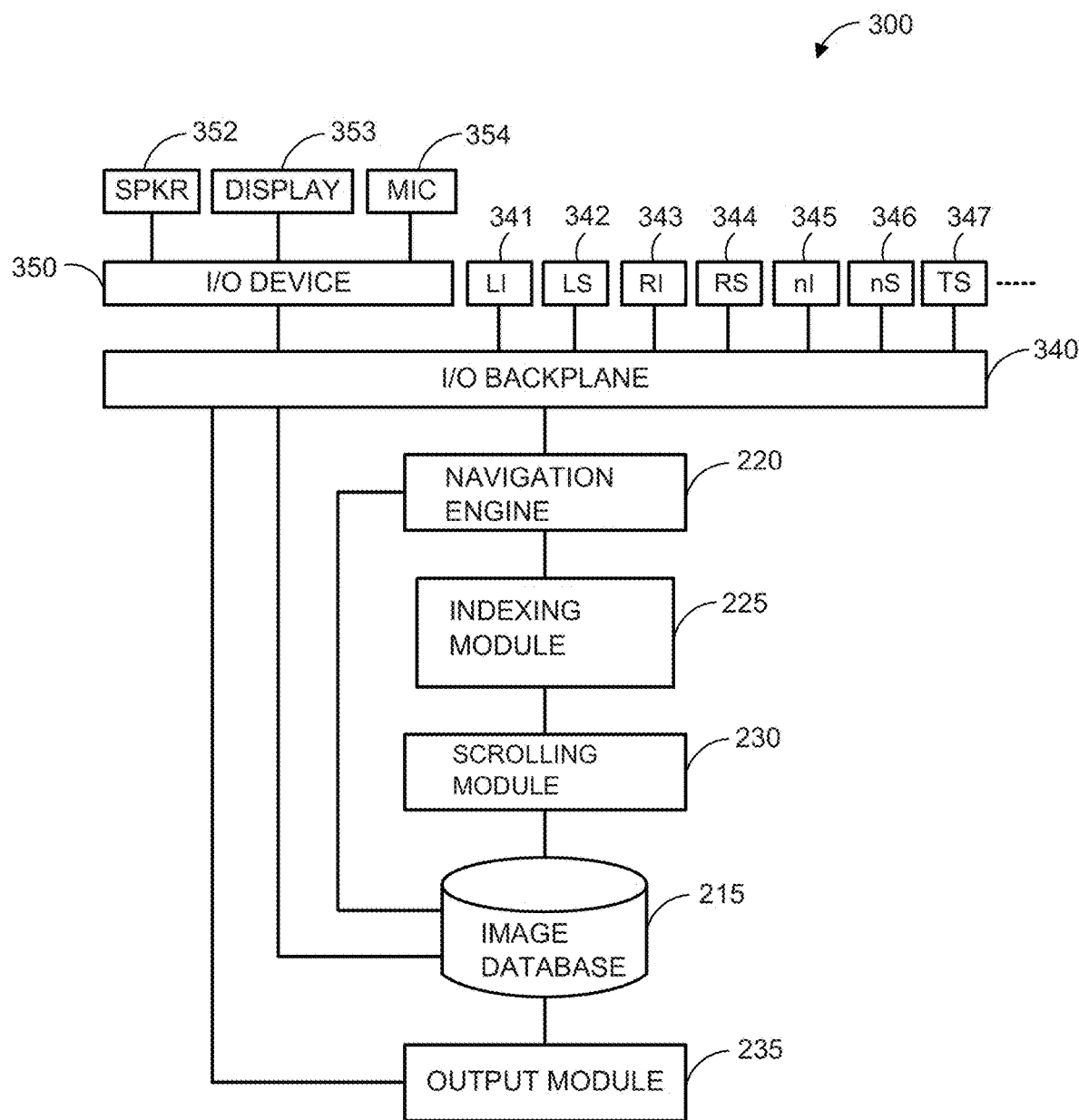
FIG. 3 is a concept diagram illustrating the system, according to some embodiments.

FIG. 3 is a concept diagram illustrating the system, according to some embodiments. The system 300 contains components that can be used in a typical embodiment. In addition to the image database 215, the navigation engine 220, the indexing module 225, the scrolling module 230, and the output module 235 shown in FIG. 2, the memory 210 of the device 300 also includes a data exchange module 245 and the browser program module (not shown) for accessing the external data. The system includes a speaker 352, display 353, and a printer 354 connected directly or through I/O device 350, which is connected to I/O backplane 340.

In some embodiments, the system 300 can be implemented in a stand-alone device, rather than a computer system or network. In FIG. 3, for example, the I/O device 350 connects to the speaker (spkr) 352, display 353, and microphone (mic) 354, but could also be coupled to other features. Such a device can have a left-hand indexing state selector 341, a left-hand scrolling state selector 342, a right-hand indexing state selector 343, a right-hand scrolling state selector 344, an "nth" indexing state selector 345, an "nth" scrolling state selector 346, and a timer state selector 347 for assisting in governing the speed of image analysis, with each state selector connected directly to the I/O backplane 340.

In some embodiments, the system further comprises security measures to protect the subject's privacy, integrity of data, or both. Such security measures are those well-known in the art such as firewalls, software, and the like. In addition, the system can be configured for use in an environment that requires administrative procedures and control. For example, the system can include an administrative module (not shown) operable to control access, configure the engines, monitor results, perform quality assurance tests, and define audiences for targeting and trending. Since the system can safely be provided by a network and, in some embodiments, the system is coupled to a network, the security measures can help protect the contents of the system from external intrusions.

In some embodiments, the system is a web enabled application and can use, for example, any version of a Hypertext Transfer Protocol (HTTP) and Hypertext Transfer Protocol over Secure Socket Layer (HTTPS) available to one of skill, such as HTML5. These protocols provide a rich experience for the end user by utilizing web 2.0 technologies, such as AJAX, Macromedia Flash, etc. In some embodiments, the system is compatible with Internet Browsers, such as Internet Explorer, Mozilla Firefox, Opera, Safari, etc. In some embodiments, the system is compatible with mobile devices having full HTTP/HTTPS support, such as iPhone, PocketPCs, Microsoft Surface, Video Gaming Consoles, and the like. In some embodiments, the system can be accessed using a Wireless Application Protocol (WAP). This protocol will serve the non HTTP enabled mobile devices, such as Cell Phones, BlackBerries, Droids, etc., and provides a simple interface. Due to protocol limitations, the Flash animations are disabled and replaced with Text/Graphic menus. In some embodiments, the system can be accessed using a Simple Object Access Protocol (SOAP) and Extensible Markup Language (XML). By exposing the data via SOAP and XML, the system provides flexibility for third party and customized applications to query and interact with the system's core databases. For example, custom applications could be developed to run natively on iPhones, Java or .Net-enabled platforms, etc. One of skill will appreciate that the system is not limited to any of the platforms discussed above and will be amenable to new platforms as they develop.

Figure 4:
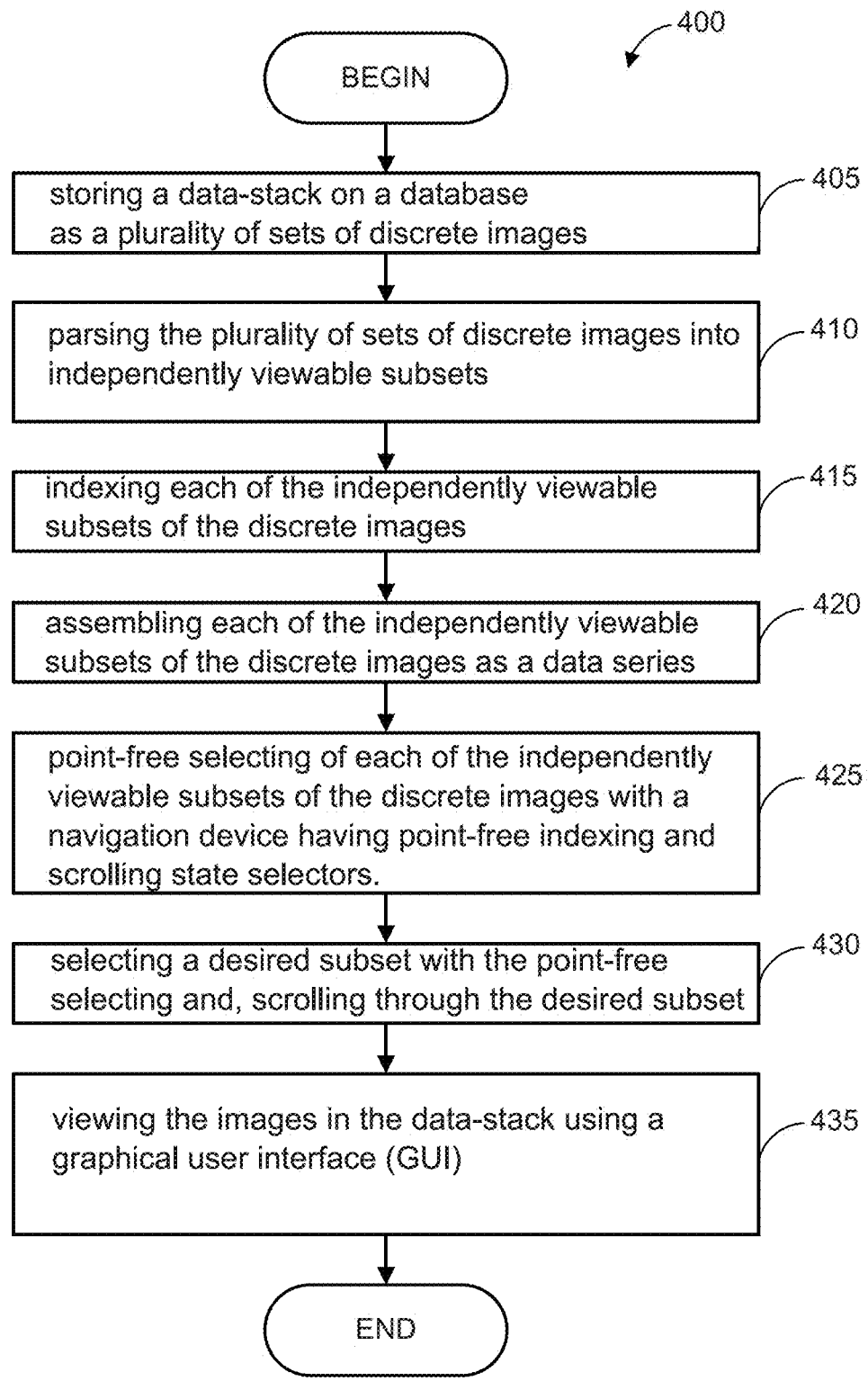
FIG. 4 illustrates a method for a rapid, efficient viewing of a data-stack through a graphical user interface, according to some embodiments.

FIG. 4 illustrates a method for a rapid, efficient viewing of a data-stack through a graphical user interface, according to some embodiments. Generally speaking, the method can comprise storing 405 a data-stack on a database that is operably connected to a processor, the database on a non-transitory computer readable storage medium for storing the data that is viewed by a user as a plurality of sets of discrete images; parsing 410 the plurality of sets of discrete images into independently viewable subsets of the discrete images with a navigation engine operably connected to the processor and on a non-transitory computer readable storage medium; indexing 415 each of the independently viewable subsets of the discrete images for an independent selection of each of the independently viewable subsets of the discrete images with an indexing module operably connected to the processor and on a non-transitory computer readable storage medium to enable point-free indexing of the subsets of the discrete images; assembling 420 each of the independently viewable subsets of the discrete images as a data series of the discrete images for scrolling through the data series with a scrolling module operably connected to the processor and on a non-transitory computer readable storage medium; and, point-free selecting 425 of each of the independently viewable subsets of the discrete images with a navigation device operably connected to the navigation engine. The point-free selecting can include, for example, independently selecting and scrolling 430, (i) selecting a desired subset within the independently viewable subsets with an indexing state selector, the desired subset indexed for an efficient selection with a point-free, activation of the state selector and, (ii) scrolling through the desired subset as a data series of the discrete images with a scrolling state selector. The viewing 435 of the images in the data-stack can be accomplished using a graphical user interface operably connected to the processor, following which, the completing of the viewing allows the user to provide an analysis of the images in the data-stack.

Figure 5:
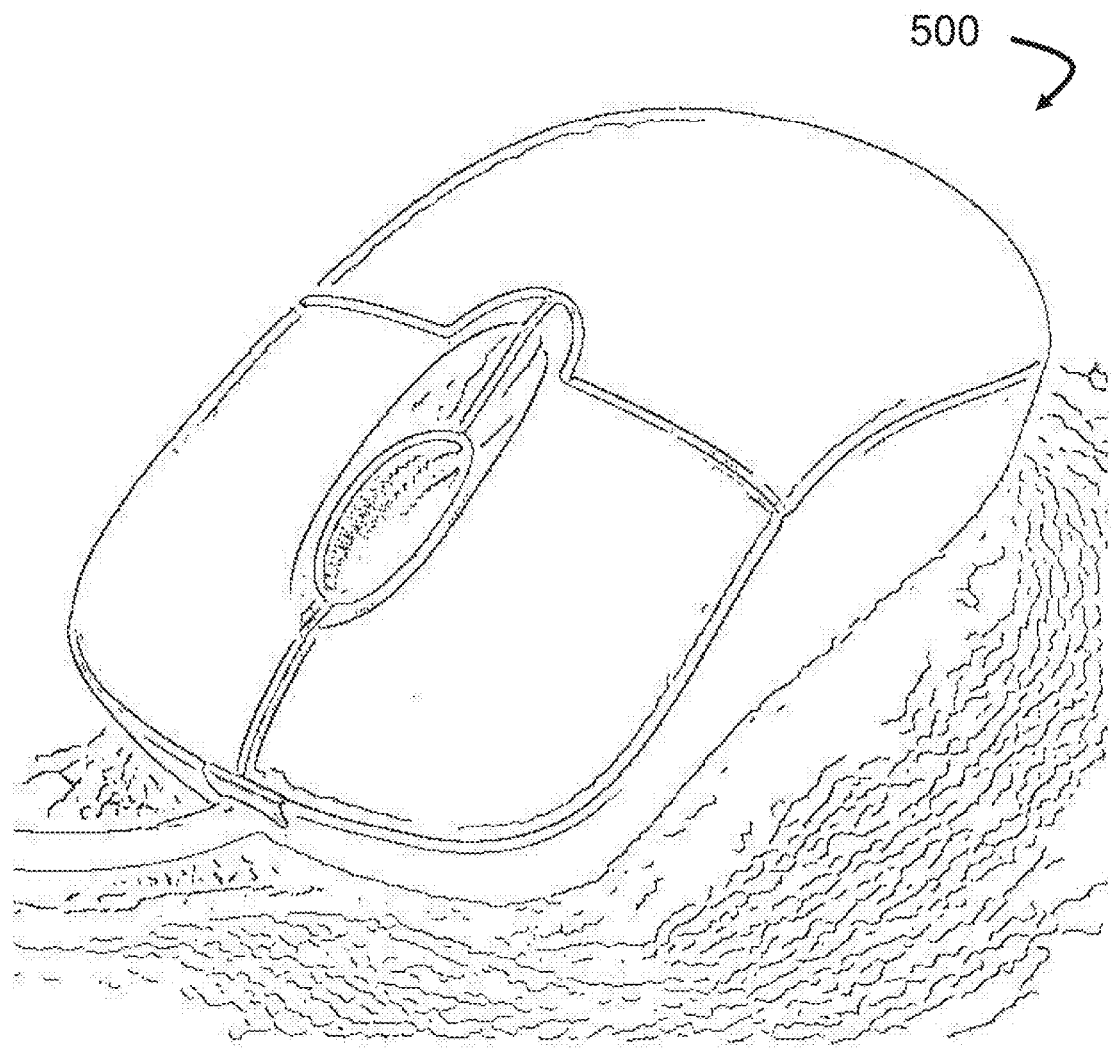
FIG. 5 illustrates a prior art navigation device used in viewing a data-stack of images, the device being a mouse with a selection button and a scroll wheel.

FIG. 5 illustrates a prior art navigation device used in viewing a data-stack of images, the device being a mouse with a selection button and a scroll wheel. In view of the prior art device, one of skill will appreciate the increased efficiency provided by the systems, components, devices, and methods taught herein. For example, in some embodiments, the teachings presented herein result in completing the viewing of the data-stack in a total viewing time that is at least 5%, at least 10%, at least 15%, at least 20%, at least 30%, at least 40%, at least 50%, or any range therein in increments of 1%, faster than a second method using a mouse with a selection button and a scroll wheel to (i)

point-and-click to select each of the independently viewable subsets on the graphical user interface, (ii) scroll through the desired subset, and (iii) point-and-click to select, both methods having an accuracy that is the same, or at least substantially the same. In some embodiments, the efficiency in the time of the viewing is improved over the second method by an amount ranging from 5% to 50%, 5% to 40%, 5% to 30%, 5% to 20%, 5% to 15%, 6% to 40%, 7% to 35%, 8% to 30%, 9% to 25%, 10% to 20%, 7% to 18%, 8% to 16%, 9% to 15%, or any range therein in increments of 1%. In some embodiments, the efficiency in the total time of the viewing is improved over the second method by an amount greater than 5%, 10%, or 15%, but also less than 50%, 48%, 46%, 44%, 42%, 40%, 38%, 36%, 34%, 32%, 30%, 28%, 26%, 24%, 22%, 20%, 18%, or 16%, or any amount or range therein, in increments of 1%, in such embodiments.

For purposes of teachings provided herein, the term "at least substantially" can be used to refer to a value that does not provide a significantly different solution than the reference value. In some embodiments, one value is at least substantially the same as a reference value where the value does not exceed one standard deviation from the reference value.

The teachings provided herein use the medical field as a forum for discussing the benefits of the systems and methods presented. It should be appreciated that an image data-stack of any type can be viewed using the teachings provided herein. In some embodiments, the medical image data includes radiographs or CT images. In some embodiments, the medical image data includes magnetic resonance imaging. In some embodiments, the medical image data includes sonographs. And, in some embodiments, the medical image data includes PET images. As such, the teachings include a system for a rapid, efficient viewing of a data-stack of medical images through a graphical user interface. Such systems can comprise a processor; a database operably connected to the processor and on a non-transitory computer readable storage medium for storing medical image data that is viewed by a user as a plurality of sets of discrete images; a navigation engine operably connected to the processor and on a non-transitory computer readable storage medium for parsing the plurality of sets of discrete images into independently viewable subsets of the discrete images; an indexing module operably connected to the processor and on a non-transitory computer readable storage medium for indexing each of the independently viewable subsets of the discrete images for an independent selection of each of the independently viewable subsets of the discrete images; a scrolling module operably connected to the processor and on a non-transitory computer readable storage medium for assembling each of the independently viewable subsets of the discrete images as a data series of the discrete images for scrolling through the desired subset as the data series of the discrete images; and, a navigation device operably connected to the navigation engine for efficiently selecting and viewing each of the independently viewable subsets of the discrete images.

As described herein, the universal format includes PACS image storage and transfer using DICOM (Digital Imaging and Communications in Medicine). In some embodiments, the PACS includes a web-based interface to utilize the internet or a Wide Area Network, for example, a VPN (Virtual Private Network) or SSL (Secure Sockets Layer). In some embodiments, the client side software may use ACTIVEX, JAVASCRIPT and/or a JAVA APPLET. In some embodiments, a more robust PACS system can be used that is operably connected to the full resources of the computer the PACS system is executing on, which may also accommodate frequent Web Browser and Java updates. In some embodiments, the PACS system will support DICOM part 18 of the DICOM standard. In some embodiments, Web Access to DICOM Objects (WADO) is used, creating the necessary standard to expose images and reports over the web as a portable medium. As such, the PACS architecture can have cross-platform operability, in which WADO can increase the distribution of images and reports to referring physicians and patients. And, in some embodiments, the system includes an image backup for HIPAA compliance. In these embodiments, the system automatically sends copies of the images in the image database to a separate computer for offsite storage.

The teachings provided herein can be used to improve current, state-of-the-art image analysis procedures and systems, such as the PACS systems. As such, the systems, components, devices, and methods in such state-of-the-art technology is hereby incorporated herein by reference in their entirety. See, for example, Strickland, N. H. Arch Dis Child 83:82-86 (2000); and, Alamu, F. O. International Journal of Computer Applications 34(4):12 (2011). It should be appreciated that current, state of the art procedures can search and extract images through a dedicated PACS server, for example, using DICOM messages and image attributes through a "C-FIND" query and a "C-MOVE" or "C-GET" request. The query can include, for example, a patient ID, as well as an ID for the user of the PACS system. The server responds with a list of C-FIND responses, each of which also represents a list of DICOM attributes, populated with values for each match. The user extracts the attributes of interest from the response to select images. The images can then be retrieved from the PACS server through either the C-MOVE or the C-GET request at the study, series or image level (set, subset, or discrete image). C-MOVE is most commonly used within enterprises and facilities, whereas C-GET is more practical between enterprises. This is because the C-MOVE request specifies "where" the retrieved images should be sent using an identifier known for the destination, the server mapping the destination to a TCP/IP address and port, knowing in advance all of the destinations. As such, the C-MOVE uses separate destinations on one or more separate connections. A C-GET, on the other hand, use the same connection as the request, not requiring that the "server" know the destinations of the TCP/IP address and port in advance, more easily working through firewalls and network address translations, which are environments in which C-MOVE messages may not get through. In some embodiments, other retrieval mechanisms, including WADO, WADO-WS and most recently WADO-RS, can be used in addition to the traditional DICOM network services, particularly for cross-enterprise use. The systems, components, devices, and methods taught herein at least speed up the navigation of images through the state-of-the-art systems, efficiently handling image selection and review, as well as reducing repetitive movements that are the result of the standard point-and-click navigation devices.

To facilitate an independent selection and mapping of discrete images for a highly efficient viewing and retrieval, the method can include giving each image it's own identification means to provide a "linking mechanism" between the navigation device and the sets, subsets, and discrete images to allow for the rapid, efficient indexing between the user and images. In some embodiments, the means for identifying a discrete image, or set of images, can include any parameter that can be used to assist in parsing or otherwise filter the images. In some embodiments, the parsing or filtering can be accomplished using any of a variety of criteria, such as image type, such as imaging technology; body part or object imaged, including position of the image within the body part or object, time imaged, and the like; and, the subject imaged, perhaps including details regarding the subject imaged such as name, age, sex, ethnicity, disease, genomic markers, other correlating diagnostics, and the like. As such, the indexing step can include further indexing/identifying each of the discrete images for independent selection of each of the discrete images as a single image or a custom-designed set of images. In some embodiments, the images are provided with a systematic, or random, alphanumeric identifier, bar code, or other known means of identification. For example, the identifiers can provide an indexing mechanism, or linking mechanism, which allows the user to identify a data-stack, a set within a data-stack, a subset within the data-stack, or a discrete image within the data-stack.

FIGS. 6A-6D illustrate a "point-and-click-free" process of viewing images in a data-stack from the perspective of a user of the systems taught herein, according to some embodiments. FIG. 6A shows a graphical user interface 605 having a set 610 of images selected by the user with the indexing state selector without requiring a point-and-click motion of a mouse. FIG. 6B shows a graphical user interface 605 having a subset 615 of set 610 of images selected by the user with the indexing state selector without requiring a point-and-click motion of a mouse. FIG. 6C shows a graphical user interface 605 having select discrete images 620 from within subset 615 of set 610 of images, each selected by the user using the scrolling state selector to view the images selected without requiring a point-and-click motion of a mouse. FIG. 6D shows a graphical user interface 605 having a select, discrete image chosen by the viewer which represents the best of select, discrete images 620 from FIG. 6C. The desired image 625 can be a single image from within the select, discrete images 620, or it can be the result of the user enhancing or modifying the image to assist in the diagnosis or display of a disorder 630 present in the select, discrete images 620. In some embodiments, the desired image can be an average of one or more of the select, discrete images 620. In some embodiments, the desired image can be a digital enhancement of one of the select, discrete images 620, such as a contrast enhancement, brightness enhancement, noise reduction, the difference of an image subtraction from another image in the data-stack, and the like.

In some embodiments, the identifier or identifiers provide a sufficient number of permutations or variability among each image such that each image will have a unique identifier among all images. In some embodiments, each image is unique to all images in the image database for 1 month, 6 months, 1 year, 2 years, 5 years, 10 years, 20 years, 50 years, 100 years, or for all time. In some embodiments, the image data base can be a master image storage database accessible through downstream computing systems over a computer network such as an intranet or internet. As such, the indexing state selector can be adapted to provide a rapid, efficient one-click indexing to sets, subsets, and discrete images, along with a scrolling state selector for scrolling through the sets and subsets to the discrete images, resulting in less repetitive motions by the user.

Figure 7:
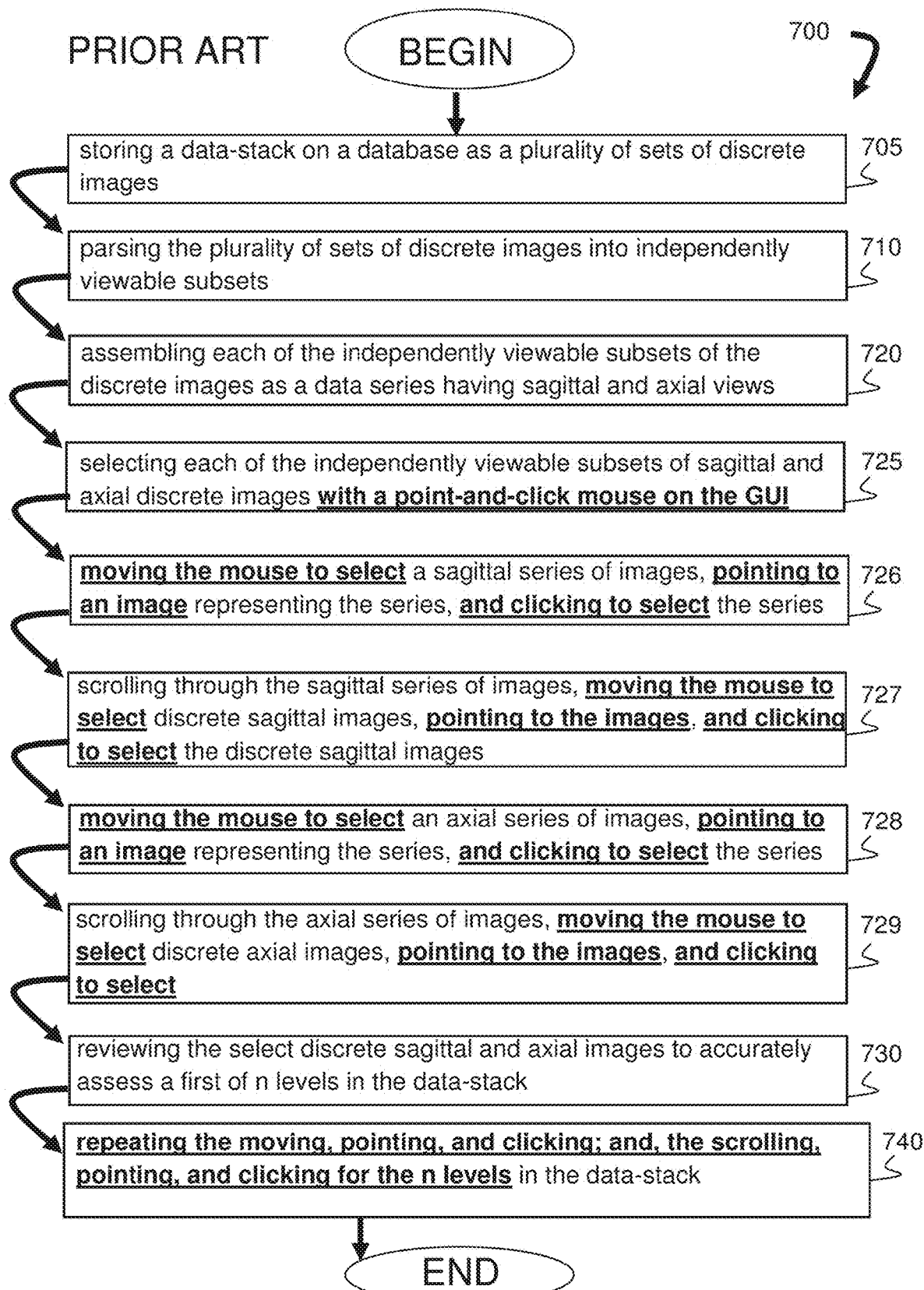
FIG. 7 provides a flowchart illustrating the slower, more complex prior art point-and-click method of viewing a data-stack of images, according to some embodiments.

FIG. 7 provides a flowchart illustrating the slower, more complex prior art point-and-click method of viewing a data-stack of images, according to some embodiments. The method can comprise storing 705 a data-stack on a database that is operably connected to a processor, the database on a non-transitory computer readable storage medium for storing the data that is viewed by a user as a plurality of sets of discrete images; parsing 710 the plurality of sets of discrete images into independently viewable subsets; assembling 720 each of the independently viewable subsets of the discrete images as a data series having, for example, sagittal and axial views; selecting 725 each of the independently viewable subsets of sagittal and axial discrete images with a point-and-click mouse on the graphical user interface; moving 726 the mouse to select a sagittal series of images, pointing to an image representing the series, and clicking to select the series; scrolling 727 through the sagittal series of images, moving the mouse to select discrete sagittal images, pointing to the images, and clicking to select the discrete sagittal images; moving 728 the mouse to select an axial series of images, pointing to an image representing the series, and clicking to select the series; scrolling 729 through the axial series of images, moving the mouse to select discrete axial images, pointing to the images, and clicking to select; reviewing 730 the select discrete sagittal and axial images to accurately assess a first of "n" levels in the data-stack; and repeating 740 the moving, pointing, and clicking; and, the scrolling, pointing, and clicking for the remainder of the "n" levels in the data-stack.

As can be seen from FIG. 7, as emphasized through the underlined portions, the current, state-of-the-art clearly requires several repetitious point-and-click motions using the mouse on the graphical user interface, motions that are eliminated using the systems, components, devices, and methods taught herein. One of skill will appreciate that the use of repetitive point-and-click motions are laborious, and that the teachings set-forth herein provide improved efficiencies through at least the direct selection of sets, subsets, and discrete images, resulting in lower repetitions of movements and, namely, the minimization, or in some embodiments elimination, of the need to point-and-click on the graphical user interface.

To again clarify and contrast the state-of-the-art with the teachings provided herein, in a state-of-the-art PACS image display used in current image navigation, the images are grouped into "stacks" of related images which are considered series. The stack of images may be related by imaging plane (for example, axial, sagittal, or coronal), reconstruction algorithm (bone, soft tissue, brain, etc.) or other specified criteria. The stack of images contained in a series are selected by point-and-click and then further navigated in a linear fashion by scrolling up and down using the mouse "wheel". The use of the combination of point-and-click with the mouse wheel is done with the user's dominant upper extremity and creates the need for an excessive amount of repetitive motions, costing excess time in the navigation and causing repetitive stress injuries in the user. As set-forth herein, the systems, components, devices, and methods provided significantly reduce the time-related costs and occupational injuries caused by these navigational limitations by creating a direct-selection mechanism that eliminates the need for point-and-click efforts. Although, the use of point-and-click can be made available to accompany the navigation device in some embodiments, it can be entirely eliminated. In some embodiments, the navigation device includes a scrolling platter and a series of one-click buttons corresponding to particular locations in a data-stack. In some embodiments, the navigation device includes a plurality of scrolling platters, each corresponding to particular set or subset of discrete images, and a plurality of series of one-click buttons, each corresponding to particular locations in the data-stack. As such, in some embodiments, the navigation device includes a first scrolling platter and a first series of one-click buttons that correspond to a first graphical user interface; and, a second scrolling platter and a second series of one-click buttons that correspond to a first graphical user interface. One of skill will appreciate that the systems taught herein can have several ergonomic and time-saving configurations.

Figure 8:
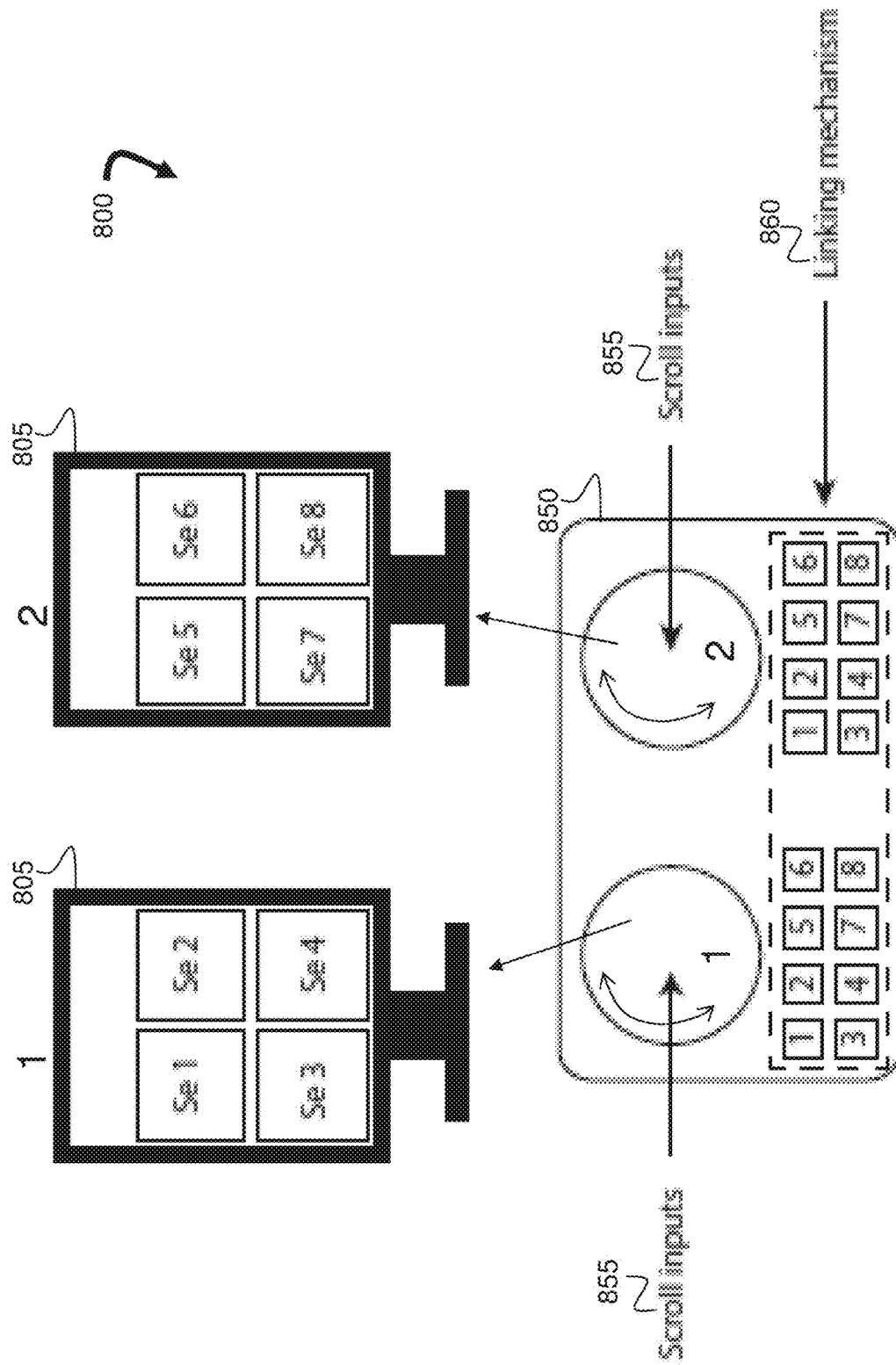
FIG. 8 illustrates a system including a bilateral, direct-selection navigation device, according to some embodiments.

FIG. 8 illustrates a system including a bilateral, direct-selection navigation device, according to some embodiments. In the bilateral system 800, there are two diagnostic monitors 805, each monitor 805 in operable communication with a navigation device 850 having a scroll input 855 (scrolling state selector) that is a rotating platter; and, a linking mechanism 860 (indexing state selector) that is parsed into a plurality of one-click buttons that link directly to equally parsed groups of image stacks or "series". The scrolling state selector 855 and indexing state selector 860 on the left side (1) can be controlled by the user's left hand, and the scrolling state selector 855 and indexing state selector 860 on the right side (2) can be controlled by the user's right hand. Each monitor 805 display stacks of images grouped into series (Se 1, Se 2, Se 3, Se 4 on the left monitor 805; and, Se 5, Se 6, Se 7, Se 8 on the right monitor 805).

Figure 9:
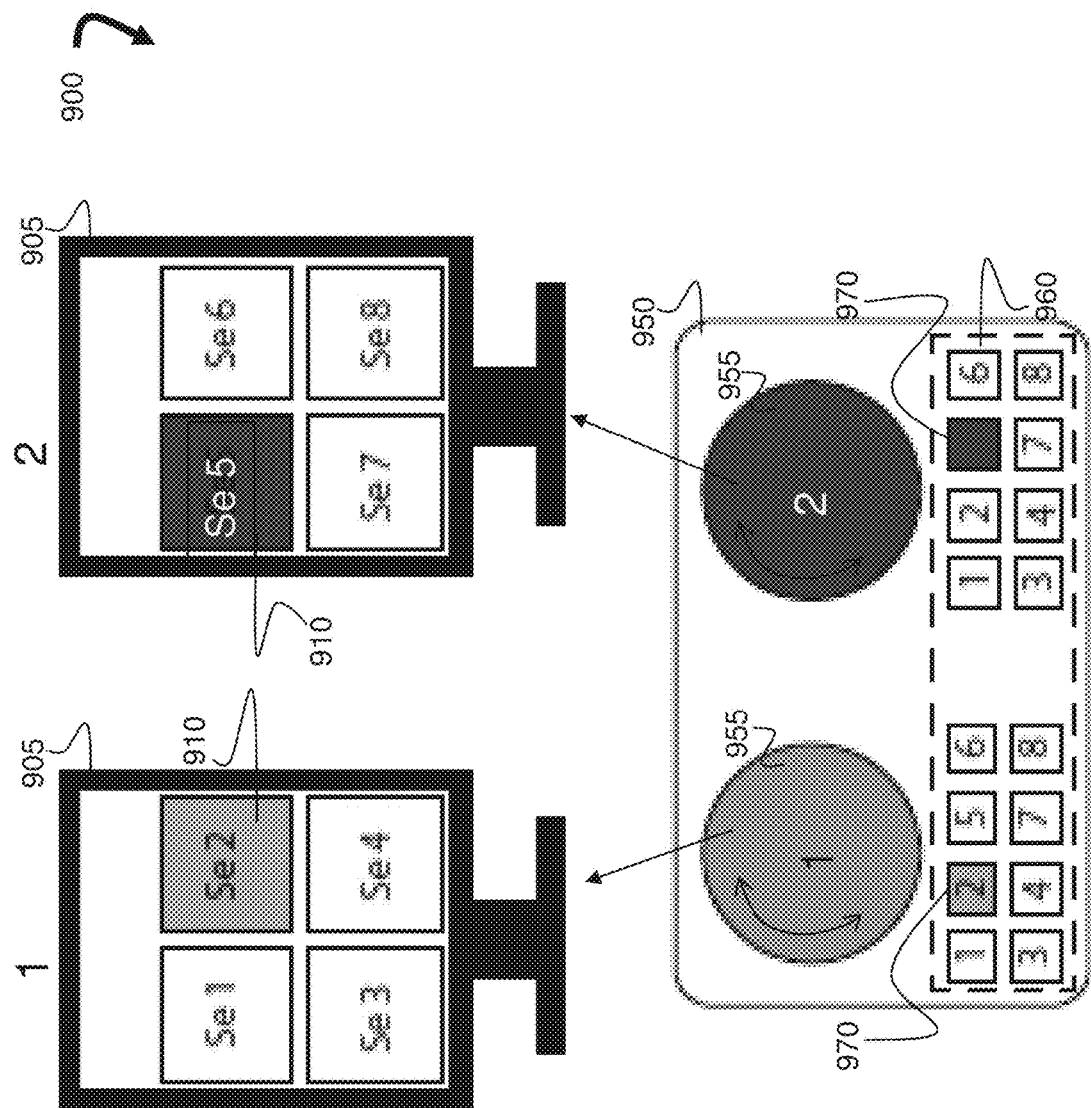
FIG. 9 illustrates the dynamics of using a system including a bilateral, direct-selection navigation device, according to some embodiments.

FIG. 9 illustrates the dynamics of using a system including a bilateral, direct-selection navigation device, according to some embodiments. In the bilateral system 900, the left monitor 905 is linked to the left scrolling state selector 955 and left indexing state selector 970 ergonomically positioned for control by the left hand; and, likewise, the right monitor 905 is linked to the right scrolling state selector 955 and right indexing state selector 970 ergonomically positioned for control by the right hand. The particular button location on each of the respective indexing state selectors 960 corresponds directly with the selection to, and linkage of, the desired series shown on the respective left and right monitors which are in-turn navigated using the respective left or right scrolling state selector 855. For example, as shown in FIG. 9, pressing button 2 will link the left platter with series 2 (Se 2), and pressing button 5 will link the right platter with series 5 (Se 5), the controls remaining linked until otherwise changed by the user.

In some embodiments, the order in which series are viewed can be selected by a default software selection, or by a custom-designed user selection. For example, a default software order of review may be sequential, in which the user will simply view the images in Se 1, then Se 2, then Se 3, and so on. A custom-designed user selection may be configured to view in a different order, for example, an order such as Se 1, Se 3, Se 2, and the Se 4. Or, perhaps the user prefers to alternate between left screen and right screen to balance the use of the left hand and right hand during the course of a day, for example, Se 1, Se 5, Se 2, Se 6, Se 3, Se 7, Se 4, Se 8, and so on.

In some embodiments, where a point-and-click mouse is part of the system, once the series is linked to a scrolling state selector, such as a platter, the user can point-and-click the mouse anywhere on either screen and the left platter will remained locked-into scrolling strictly according to the series currently indexed through the linking mechanism on the left side monitor, and the right platter will remained locked-into scrolling strictly according to the series currently indexed through the linking mechanism on the right side monitor. This strict linking, regardless of mouse position, provides the mouse as a sort of optional "third control" that allows for an occasional selection of single image without leaving a currently scrolling position or positions on the left and/or right monitors. A third monitor can be provided as a "random selection monitor" to allow for this flexibility of use with a mouse as an ancillary tool in some embodiments.

Figure 10:
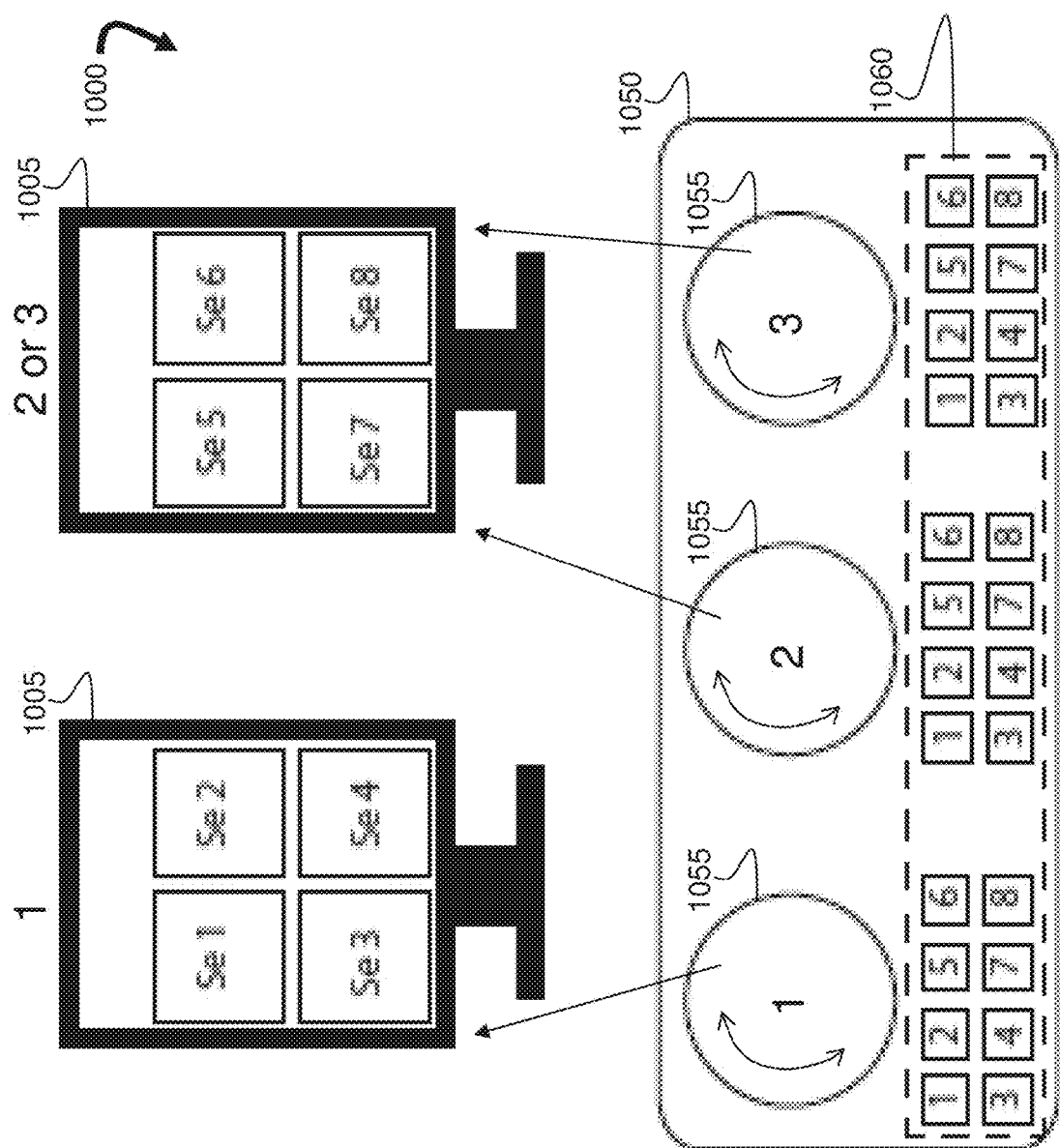
FIG. 10 illustrates a system having bilateral monitors, where at least one monitor has a plurality of scrolling state selectors and linking state selectors, according to some embodiments.

FIG. 10 illustrates a system having bilateral monitors, where at least one monitor has a plurality of scrolling state selectors and linking state selectors, according to some embodiments. This figure illustrates how more than one scrolling and linking mechanism can be used on a single monitor. As shown in FIG. 10, the system 1000 has a bilateral monitors 1005 and a navigation device 1050, in which the monitor 1005 on the left (1) has a single scrolling state selector 1055 and a single indexing state selector 1060 linked to the respective scrolling state selector 1055. The monitor 1005 on the right (2 or 3) has a plurality (2,3) of scrolling state selectors 1055 and a plurality of indexing state selectors 1060 respectively linked to the plurality of scrolling state selectors. The controlling platter (2 or 3) and respective linking mechanism for the right monitor 1005 can be selected for use on the right monitor, for example, using a selection button that can be separate or shared with a state selector. In some embodiments, the platter (2 or 3) can be pushed to toggle/select the platter (2 or 3) for viewing the series linked to that particular platter at any given time.

Figure 11:
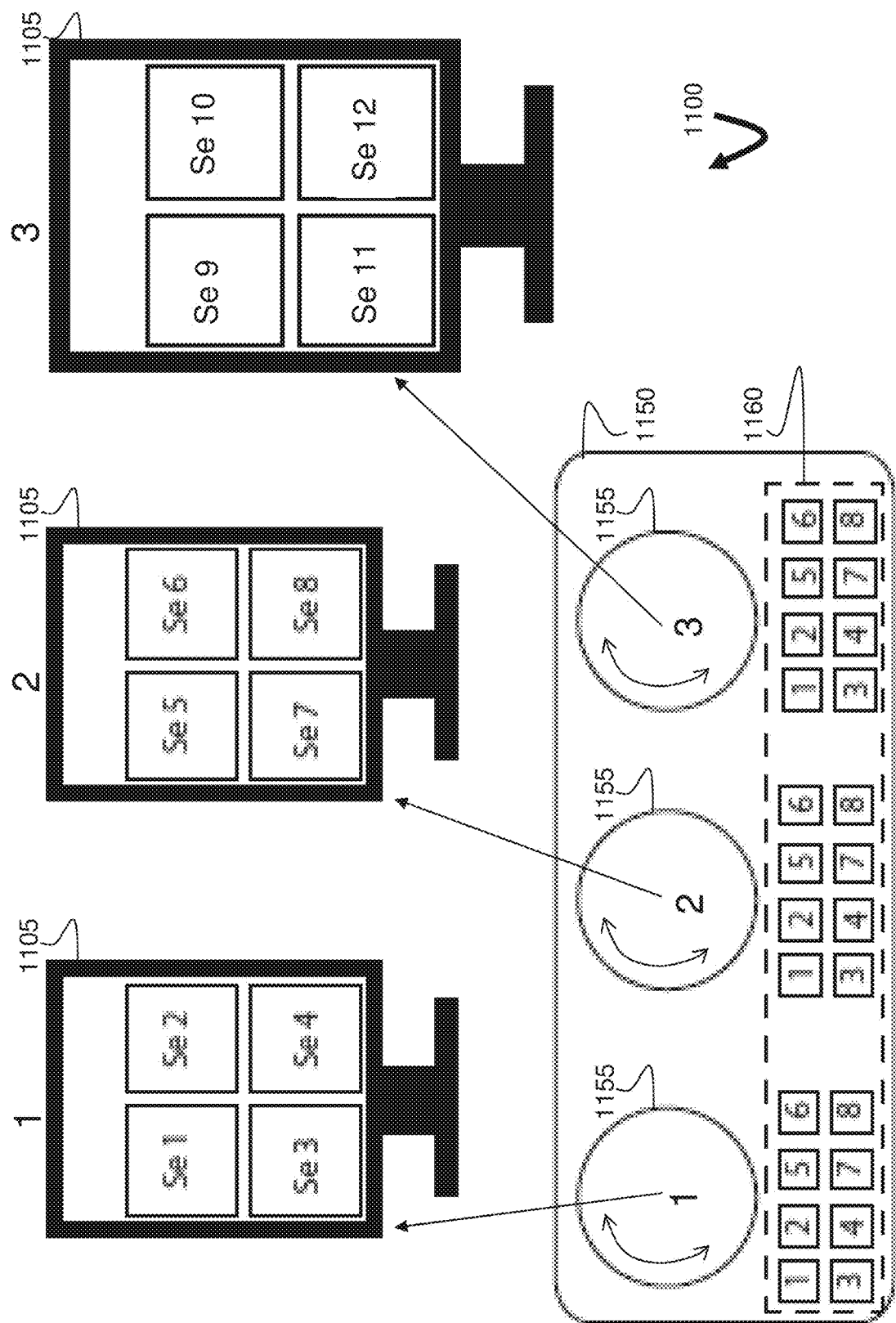
FIG. 11 illustrates a system having three monitors, each monitor having it's own respective platter and linking mechanism, according to some embodiments.

FIG. 11 illustrates a system having three monitors, each monitor having it's own respective platter and linking mechanism, according to some embodiments. This figure illustrates how a plurality of series can be linked through a plurality of indexing state selectors in a one-to-one relationship with a plurality of monitors and respective scrolling state selectors. One of skill will appreciate that such a system will decrease the complexity of the operation, simplifying the viewing procedures and, thus, inherently reducing fatigue in the user. The system 1100 has three monitors 1105 (1, 2, and 3) with respective scrolling state selectors. In FIG. 11, the plurality of platters and linking mechanisms are combined into one navigation device 1150 having scrolling state selectors 1155 and indexing state selectors 1160, although each can be an independent navigation device, allowing for ease of positioning with any respective monitor placement. One of skill may find this configuration desirable, as it allows for separation of common view series on their own dedicated screens, such as (1) posterior-anterior, (2) lateral, and (3) oblique; (1) axial, (2) coronal, (3) sagittal; and, the like. One of skill will also appreciate how having the related series open and ready for viewing with separate controls for each would translate into a substantial time savings that translates into production, and a reduction in repetitive motions that translates into a reduction in repetitive stress injuries.

In some embodiments, a "substantial time savings" can be used to refer to a time savings of greater than 5%, greater than 10%, greater than 15%, greater than 20%, greater than 30%, greater than 40%, or greater than 50%. In some embodiments, the time savings can range from 5% to less than 70%, from 10% to less than 60%, from 15% to less than 50%, from 20% to less than 40%, or any range therein. In some embodiments, a "reduction in repetitive motions" can be used to refer to a reduction in number of movements of greater than 100%, greater than 200%, greater than 300%, greater than 400%, greater than 500%, greater than 600%, greater than 700%, greater than 800%, or greater than 900%. In some embodiments, the reduction in number of motions can range from 2× to 20×, from 3× to 15×, from 4× to 10×, 5× to 8×, 3× to 30×, 7× to 30×, 7.2× to 12.2×, 7.2× to 16.8×, 12.2× to 16.8×, 12.2× to 28.4×, 16.8× to 28.4×, 7.2× to 28×, 4× to 40×, 5× to 50×, or any range or amount therein in increments of 0.1×.

The use of a mouse to select a series, for example, requires (i) a movement of the arm to hold the mouse, (ii) at least one movement of the arm to place the cursor over a desired series on a monitor, often likely requiring several "strokes" of the mouse on a surface to place the cursor over the desired series on the monitor, (iii) a click of the mouse to select the desired series, and (iv) at least one movement of the mouse to remove the cursor from the image for viewing. The systems, components, devices, and methods taught herein will always require a mere single push of a button. This is a basic example that shows a minimal improvement in repetitive motions of at least 4×, and often likely more due to the several strokes of the mouse on the surface to place the cursor over the desired series. Likewise, the use of a mouse wheel to scroll through a series also can require several strokes of the wheel, as the wheel is designed to fit into the small housing of the mouse and, as such, is of a small diameter having only a portion of the circumference of the wheel exposed for tactile contact for scrolling through the series. As such, the scroll wheel of the mouse requires the user to make several repeated and short strokes over the scroll wheel to scroll a significant distance. A scrolling state selector that is a "platter", on the other hand, does not require repetitive stroking of the platter to scroll the significant distance. The platter can be configured with a much larger circumference than the scroll wheel of the mouse, providing (i) precision when desired for carefully scrolling a short distance on the monitor, and (ii) speed when desired for scrolling over the significant distance on the monitor. The platter provides a mechanism adapted to scroll carefully without the repetitive motions associated with "stroking" a mouse scroll wheel, due to the larger diameter of the platter and the ability to rotate the platter a plurality of times without the need to move, and then release, and then move, and again release, repeatedly.

Relative repetitive motions can be compared between the mouse scroll wheel and the platter. For example, assuming that the distance moved by a user's finger around (i) the circumference of the scrolling wheel of the mouse and (ii) the circumference of the platter are both equal to the distance traveled on the monitor and, likewise, the distance/time is accepted as a desired tactile speed of the movement of the information across the monitor, then the relative repetition of movements required to travel across one set of data on a monitor can be compared between the mouse wheel and the platter. For purposes of comparison, we can first assume the average diameter of a mouse scroll wheel ranges from about 0.75 inches to about 1.25 inches, and the average platter diameter ranges from about 3.0 inches to about 7.0 inches. We can then use a method similar to the use of the circumference of a surveyor's wheel to measure distance traveled on the ground to measure distance traveled across a monitor by the mouse scroll wheel relative to the distance traveled across the monitor using the platter. The following table, Table 1, on scrolling efficiency uses this method, and assumes a 1:1 circumference:distance across the monitor, to compare the repetitions required to travel from top to bottom of a 17 inch computer screen (measured diagonal, corner-to-corner) with an aspect ratio of 16:10 (height:width), which is a distance of about 14 inches.

TABLE 1

| | Mouse scroll wheel state selector | | Platter scrolling state selector | |
|---|---|---|---|---|
| Diameter (inches) | 0.75 | 1.25 | 3.00 | 7.00 |
| Circumference (inches) | 2.355 | 3.925 | 9.42 | 21.98 |
| Tactile surface exposed (inches); distance per stroke (assume 33% of wheel circumference) | 0.77 | 1.30 | 100% | 100% |
| Repetitive motions to travel 14 inches = 14/distance per stroke | 18.18 strokes | 10.77 strokes | 1.49 rotations | 0.64 rotations |
| Excess repetitions of mouse wheel over latter | 18.18/0.64 = 28.4× | 10.77/0.64 = 16.8× | | |
| | 18.18/1.49 = 12.2× | 10.77/1.49 = 7.2× | | |

Comparing "strokes" of a mouse scroll wheel to "rotations" of a platter is not direct. Nevertheless, it is clear that the strokes of the mouse scroll wheel are purely repetitive motions, whereas the rotations are not purely repetitive. This is because there is a clear repetitive stress applied to the user when the user touches, pushes to rotate, and then releases the mouse scroll wheel, whereas to rotate the platter, there is no push-release repetition, merely a smooth rotation. Comparing "one stroke" of the mouse wheel to "one rotation" of the platter, however, shows that the scrolling alone is more efficient with the platter by a factor ranging from about 7.2× to about 28.4× in view of the estimated wheel and platter circumferences. In addition, the stress on the user's body to rotate the platter involves much less impact than the stress on the user's body to stroke the wheel on the mouse. For example, the repetitive motion of the tendons in the sheaths in the carpal tunnel region would be expected to be much higher when repeated stroking the scrolling wheel of the mouse when compared to merely rotating the platter even if the repetitive motions were equal, and this would be expected to be significantly exacerbated through the mouse scrolling wheel by a factor of 7.2× to 28.4× in view of the repetitive stress estimate above.

Figure 12:
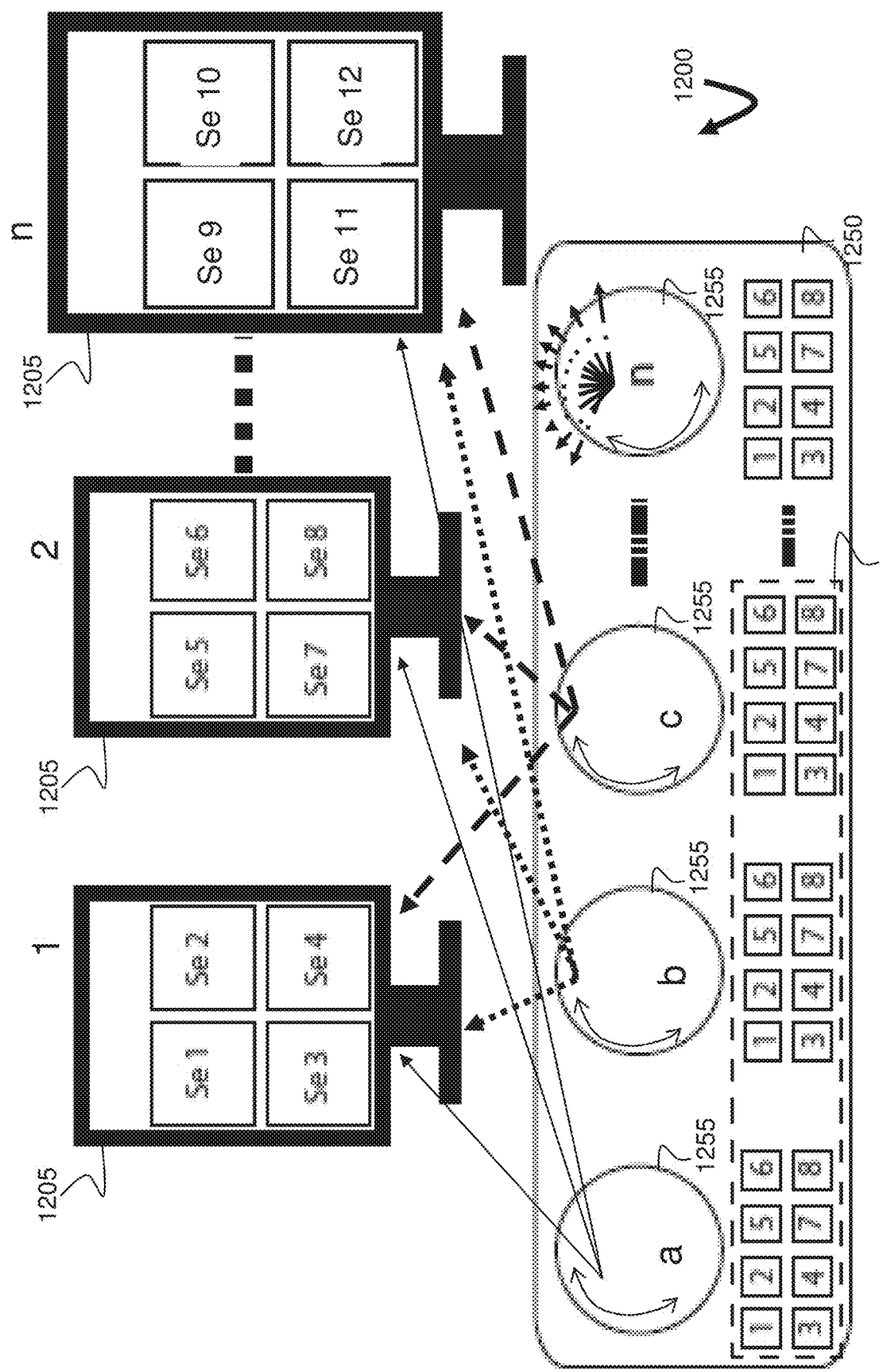
FIG. 12 illustrates a system having "n" monitors, each monitor having it's own respective platter and linking mechanism, according to some embodiments.

FIG. 12 illustrates a system having "n" monitors, each monitor having it's own respective platter and linking mechanism, according to some embodiments. This figure illustrates how a plurality of series can be linked through a plurality of indexing state selectors in a one-to-one relationship with a plurality of monitors and respective scrolling state selectors. This figure also shows that linkage between each monitor and each navigation device can be independently selected, depending on the subjective preferences of the user, which can change from case to case. One of skill will appreciate that such a system will decrease the complexity of the operation, simplifying the viewing procedures and, thus, inherently reducing fatigue in the user. The system 1200 has "n" monitors 1205 (1, 2, . . . n) with respective scrolling state selectors. In FIG. 12, the plurality of platters and linking mechanisms are combined into one navigation device 1250 having scrolling state selectors 1255 and indexing state selectors 1260, although each can be an independent navigation device, or any subgroup number of devices as convenient by design, allowing for ease of positioning with any respective monitor placement. One of skill may find this configuration desirable, as it allows for separation of an of several common view series, or perhaps uncommon view series, on their own dedicated screens, such as any combination of 1, 2, . . . n series of images in a data-stack, or perhaps simultaneously viewing series on more than one body region, such as in a study of metastasis throughout a cancer patient, or perhaps distribution of trauma throughout a trauma patient. Or, perhaps simultaneously viewing series through more than one imaging technology, such as CT, MRI, ultrasound, etc. One of skill will also appreciate how having the related series open and ready for viewing with separate controls for each series of images would translate into a substantial time savings that translates into production, and a reduction in repetitive motions that translates into a reduction in repetitive stress injuries.

Figure 13:
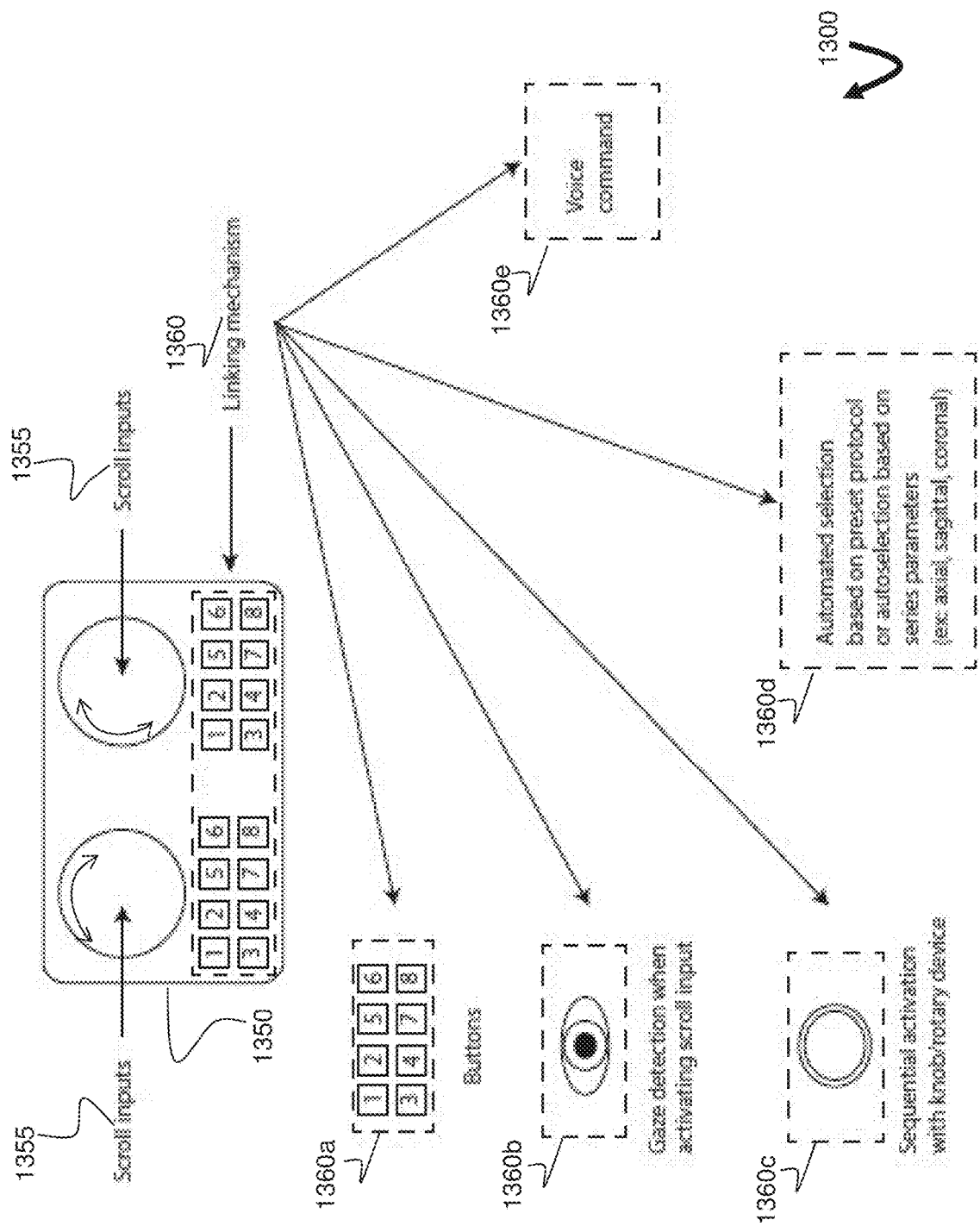
FIG. 13 illustrates various embodiments of the indexing state selector, according to some embodiments.

FIG. 13 illustrates various embodiments of the indexing state selector, according to some embodiments. The navigation device 1350 has scroll inputs, or scrolling state selectors 1355 and a linking mechanism, or indexing state selectors 1360. In this embodiment, the indexing state selectors 1360 are buttons 1360a linked to independent sets of images, subsets of images, or discrete images, such that the user does not have to click to link the indexing state selector. One of skill will appreciate that other technologies can be used for the direct link to independent sets of images, subsets of images, or discrete images. For example, gaze detection 1360b can be used, such that the systems taught herein may have gaze detection capabilities that allow the navigation device to detect when a user is looking at a particular monitor, as well as the independent sets of images, subsets of images, or discrete images on the monitor. When the device detects that the user is looking at the monitor, or independent sets of images, subsets of images, or discrete images on the monitor, the device can identify and display the target of the user's gaze. The gaze technology can also initiate an automatic timer in the dwell module that triggers a timed scrolling, and the scrolling may pause when the device detects that the user has looked away from the monitor, or the independent sets of images, subsets of images, or discrete images displayed on the monitor. The device may resume the scrolling timer when the device detects that the user is again looking towards the device. Likewise, the buttons on the linking mechanism can, in the alternative, simply be another type of state selector 1360c, such as an indexed knob, switch, or rotary selection device or devices. Likewise, the system can index images based on a preset protocol 1360d, which can be an autoselection based on desired series parameters that can be independently selected for each case, or can be a default setting, such as axial images shown first, sagittal views shown second, and coronal views shown third, etc. Or, axial images can be shown on the first monitor, while sagittal views shown on the second monitor, and coronal views shown on the third monitor, etc. Moreover, since vocal command systems have improved tremendously, the indexing mechanism won't even require the push of a button, but merely a vocal command 1360e in some embodiments.

Figure 14:
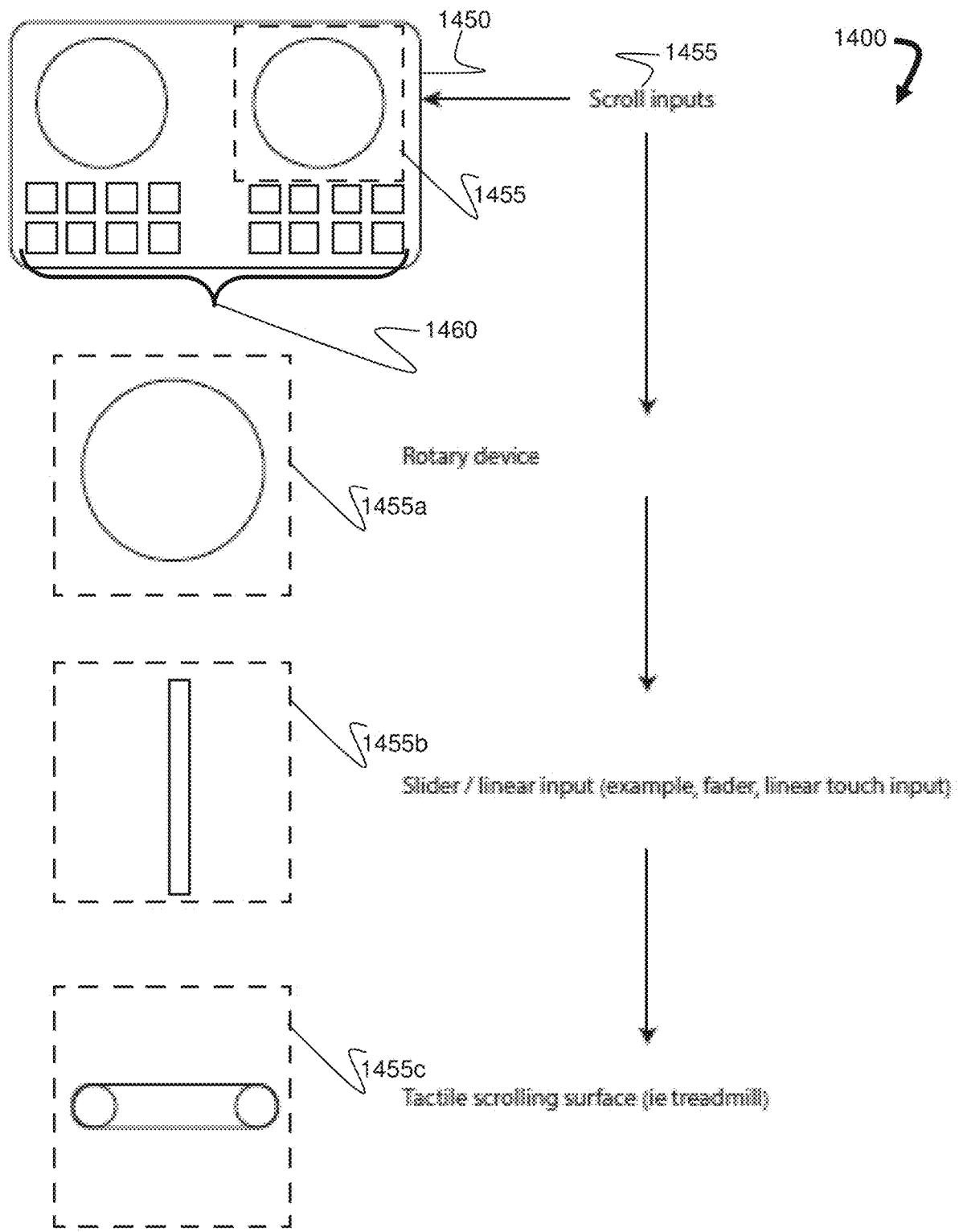
FIG. 14 illustrates various embodiments of the scrolling state selector, according to some embodiments.

FIG. 14 illustrates various embodiments of the scrolling state selector, according to some embodiments. The navigation device 1450 has scroll inputs, or scrolling state selectors 1455 and a linking mechanism, or indexing state selectors 1460. In this embodiment, the scrolling state selectors 1455 are platters 1455a linked to independent sets of images, subsets of images, or discrete images, such that the user does not have to click to link the platter. One of skill will appreciate that other technologies can be used for the direct link to independent sets of images, subsets of images, or discrete images for scrolling. For example, a slider switch/fader 1455b, or a tactile scrolling surface 1455c like a finger treadmill, can be used. Likewise, the buttons on the linking mechanism can, in the alternative, simply be another type of state selector 1360c, such as an indexed knob, switch, or rotary selection device or devices. Likewise, the system can scroll images based on a preset protocol, which can be an auto-scroll based on desired series parameters that can be independently selected for each case, or can be a default setting, such as a scroll rate for axial views, a scroll rate for sagittal views, and a scroll rate for coronal views, etc. Or, a scroll rate for the first monitor, a scroll rate for the second monitor, and a scroll rate for the third monitor, etc. Moreover, since vocal command systems have improved tremendously, the scrolling mechanism won't even require the push of a button, but merely a vocal command to set the scrolling speed in some embodiments.

The systems and methods taught herein can support viewing of image data with a handheld device. The CPU on a handheld computer system, however, can have difficulties concurrently processing the audio data files described herein. In some embodiments, a handheld computing system may have latency difficulties. As such, data files may require compression. For example, in some embodiments, the data files can be compressed using a compression technique, for example, such as QUICKTIME by Apple. Other file compression techniques can be used. IMA4 can also be used to compress the files in some embodiments. In some embodiments, the system requires at least a 600-700 MHz processor. An older APPLE system might have a 400 MHz processor, although more recent systems can have a 1300 MHz processor, for example. The IMA4 compression method compresses the audio data file, for example, to about 25% of file size. Examples of video compression includes DIRAC, SMPTE, and HEVC formats. In some embodiments, it should be appreciated, however, that the system can use pure, uncompressed wave files. Many home PCs, however, may not need compressed files due to the more powerful processors currently available for home PCs. The bandwidth of the computer system, i.e. the size of the CPU and memory will dictate whether compression is necessary. One of skill in the art will appreciate that certain compression technologies may be needed in some systems for optimum performance and that these technologies are readily identifiable and accessible.

Figure 15:
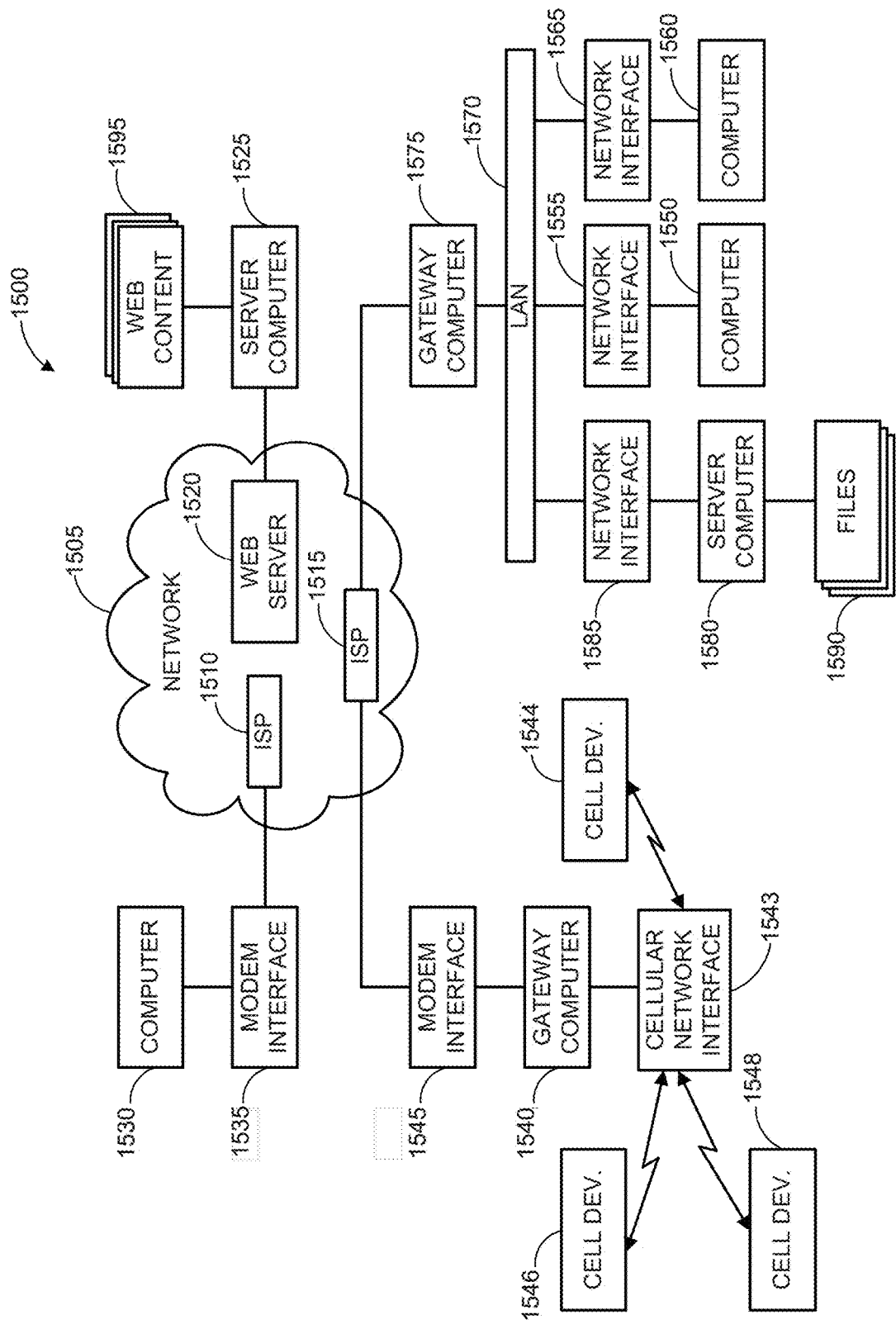
FIG. 15 shows how a network may be used for the system, according to some embodiments.

FIG. 15 shows how a network may be used for the system, according to some embodiments. Several computer systems are coupled together through a network 1505, such as the internet, along with a cellular network and related cellular devices. The term "internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 1505 is typically provided by internet service providers (ISP), such as the ISPs 1510 and 1515. Users on client systems, such as client computer systems 1530, 1550, and 1560 obtain access to the internet through the internet service providers, such as ISPs 1510 and 1515. Access to the internet allows users of the client computer systems to exchange information, receive and send e-mails, and view documents, such as documents which have been prepared in the HTML format. These documents are often provided by web servers, such as web server 1520 which is considered to be "on" the internet. Often these web servers are provided by the ISPs, such as ISP 1510, although a computer system can be set up and connected to the internet without that system also being an ISP.

The web server 1520 is typically at least one computer system which operates as a server computer system and is configured to operate with the protocols of the worldwide web and is coupled to the internet. Optionally, the web server 1520 can be part of an ISP which provides access to the internet for client systems. The web server 1520 is shown coupled to the server computer system 1525 which itself is coupled to web content 1595, which can be considered a form of a media database. While two computer systems 1520 and 1525 are shown in FIG. 15, the web server system 1520 and the server computer system 1525 can be one computer system having different software components providing the web server functionality and the server functionality provided by the server computer system 1525 which will be described further below.

Cellular network interface 1543 provides an interface between a cellular network and corresponding cellular devices 1544, 1546 and 1548 on one side, and network 1505 on the other side. Thus cellular devices 1544, 1546 and 1548, which may be personal devices including cellular telephones, two-way pagers, personal digital assistants or other similar devices, may connect with network 1505 and exchange information such as email, content, or HTTP-formatted data, for example. Cellular network interface 1543 is coupled to computer 1540, which communicates with network 1505 through modem interface 1545. Computer 1540 may be a personal computer, server computer or the like, and serves as a gateway. Thus, computer 1540 may be similar to client computers 1550 and 1560 or to gateway computer 1575, for example. Software or content may then be uploaded or downloaded through the connection provided by interface 1543, computer 1540 and modem 1545.

Client computer systems 1530, 1550, and 1560 can each, with the appropriate web browsing software, view HTML pages provided by the web server 1520. The ISP 1510 provides internet connectivity to the client computer system 1530 through the modem interface 1535 which can be considered part of the client computer system 1530. The client computer system can be a personal computer system, a network computer, a web TV system, or other such computer system.

Similarly, the ISP 1515 provides internet connectivity for client systems 1550 and 1560, although as shown in FIG. 15, the connections are not the same as for more directly connected computer systems. Client computer systems 1550 and 1560 are part of a LAN coupled through a gateway computer 1575. While FIG. 15 shows the interfaces 1535 and 1545 as generically as a "modem," each of these interfaces can be an analog modem, isdn modem, cable modem, satellite transmission interface (e.g. "direct PC"), or other interfaces for coupling a computer system to other computer systems.

Client computer systems 1550 and 1560 are coupled to a LAN 1570 through network interfaces 1555 and 1565, which can be ethernet network or other network interfaces. The LAN 1570 is also coupled to a gateway computer system 1575 which can provide firewall and other internet related services for the local area network. This gateway computer system 1575 is coupled to the ISP 1515 to provide internet connectivity to the client computer systems 1550 and 1560. The gateway computer system 1575 can be a conventional server computer system. Also, the web server system 1520 can be a conventional server computer system.

Alternatively, a server computer system 1580 can be directly coupled to the LAN 1570 through a network interface 1585 to provide files 1590 and other services to the clients 1550, 1560, without the need to connect to the internet through the gateway system 1575.

Through the use of such a network, for example, the system can also provide an element of social networking, whereby users can contact other users. In some embodiments, the system can include a messaging module operable to deliver notifications via email, SMS, and other mediums. In some embodiments, the system is accessible through a portable, single unit device and, in some embodiments, the input device, the graphical user interface, or both, is provided through a portable, single unit device. In some embodiments, the portable, single unit device is a hand-held device. In some embodiments, the systems and methods can operate from the server to a user, from the user to a server, from a user to a user, from a user to a plurality of users, comparable to a system that may be used in an MMO environment (massive, multi-user environment), from a user to a server to a user, from a server to a user (or plurality of users) and a teacher (or plurality of teachers), or a server to a plurality of users and a conductor, for example. The interactions can be through real-time users, perhaps available for real-time interaction in a forum that can be either a public, private, semi-private, or member-only chat room; or, not real-time, such as a user environment including text, wavefile, and/or video communications. A blog-type environment, or message room, is an example of an environment that is not real-time.

A real-time environment provides responses to communications within set time constraints, or "deadlines". Real-time responses, for example, can be provided on the order of milliseconds, and sometimes microseconds, ranging from 0.001 milliseconds to 999 milliseconds, from 0.01 milliseconds to 900 milliseconds, from 0.02 milliseconds to 800 milliseconds, from 0.03 milliseconds to 700 milliseconds, from 0.04 milliseconds to 600 milliseconds, from 0.05 milliseconds to 500 milliseconds, from 0.06 milliseconds to 400 milliseconds, from 0.07 milliseconds to 300 milliseconds, from 0.08 milliseconds to 200 milliseconds, from 0.09 milliseconds to 100 milliseconds, from 0.10 milliseconds to 50 milliseconds, from 1.0 milliseconds to 10 milliseconds, or any range therein in increments of 0.001 millisecond. In some embodiments, the system response occurs without perceivable delay. It should be appreciated that the network can also be configured to provide text and/or audio for real-time messaging, posting of messages, posting of instructional, posting of news or other items of a related interest to the users, and the like.

It should also be appreciated that a network can include traditional network media for general communications by the users and the public. For example, television cable, optical fiber, satellite, and the like, in which such digital information can be transmitted to users. Such use of traditional media will facilitate use of the teachings provided herein with traditional media channels. In some embodiments, the systems, components, devices, and methods can be used provide non-confidential information, such as information in which confidentiality has been legally waived, in the interest of sharing information over the network.

The following examples are illustrative of the uses of the present teachings. It should be appreciated that the examples are for purposes of illustration and are not to be construed as otherwise limiting to the teachings.

Example 1. The Ergonomic Workstation Reduces the Time Required to Analyze a Case This example compares the time required to analyze a set of thoracic and abdominal cases using a traditional workstation based on a point-and-click mouse control and an ergonomic workstation having the system with indexing and scrolling controls, such as an indexing state selector and a scrolling state selector. Three (3) thoracic studies and three (3) abdominal studies were compared. The data stacks for the thoracic studies contained images broken into 400-419 images showing axial, coronal, sagittal, and maximum intensity projection (MIP) views. The data stacks for the abdominal studies contained 415-465 images broken into 4 subsets of images showing axial, coronal, sagittal, and MIP views. The following table, Table 2, shows the results of this example:

TABLE 2

| Method | Traditional point-and-click | Ergonomic index-and-scroll | Traditional point-and-click | Ergonomic index-and-scroll |
|---|---|---|---|---|
| Region | Abdominal | | Thoracic | |
| Run 1 (minutes) | 3.37 | 2.75 | 4.25 | 3.53 |
| Run 2 (minutes) | 3.83 | 3.08 | 4.50 | 3.68 |
| Run 3 (minutes) | 4.25 | 3.58 | 4.08 | 3.48 |
| Run 1 time saved (minutes) | | 0.62 | | 0.72 |
| Run 2 time saved (minutes) | | 0.75 | | 0.82 |
| Run 3 time saved (minutes) | | 0.67 | | 0.60 |
| AVG time saved (seconds) | | 41 | | 43 |
| ST DEV time saved (seconds) | | 3.9 | | 6.6 |

As shown in this example, there are statistically significant time savings available through the use of the ergonomic system. These time savings translate into less repetitive motions for the radiologist and less repetitive stress injuries, not to mention translating into a more productive work day. In addition, the time savings may also result in a better focus for the radiologist on the readings themselves, resulting in diagnoses that contain information of a higher quality. In some embodiments, the term "higher quality" can refer to a reduction in reading errors, where errors can be reduced by at least 50%, at least 40%, at least 30%, at least 20%, at least 10%, or at least 5%, in some embodiments. In some embodiments, the term "higher quality" can refer to an increase in the identification of disorders or diseases, where the increase in the identification can be at least 50%, at least 40%, at least 30%, at least 20%, at least 10%, or at least 5%, in some embodiments.

Example 2. The Ergonomic Workstation can be Adapted to Govern the Time Spent on Reviewing an Image or Set of Images This example describes the use of a dwell module to control the speed, or dwell time, at which a radiologist reviews one or more images in a data-stack. From a quality of review perspective, it may be desirable to govern and/or monitor how fast the images are reviewed by group, subgroup, or individual image and, from the perspective of delivering timely services, it may be desirable to govern and/or monitor how slow the images are reviewed by group, subgroup, or individual image.

The speed, or dwell time, can be defined as a set time that must be spent on a single image before it is possible to scroll or index away from the image in a data-stack, or the time spent on a subset of images in the data-stack before it is possible to scroll or index away from the subset of images. Or, the dwell time can be the total time spent viewing an entire case containing an entire set of images. As such, the dwell time can range from 0.25 seconds to 1.0 hour, from 0.50 seconds to 45 minutes, from 0.75 seconds to 40 minutes, from 1.0 second to 30 minutes, from 1.5 seconds to 20 minutes, from 2.0 seconds to 15 minutes, from 2.5 seconds to 10 minutes, from 3.0 seconds to 9 minutes, from 4.0 seconds to 8 minutes, from 5.0 seconds to 7 minutes, from 6.0 seconds to 6 minutes, from 7.0 seconds to 5 minutes, from 8.0 seconds to 4 minutes, from 9.0 seconds to 3 minutes, from 10.0 seconds to 2 minutes, from 15 seconds to 1.5 minutes, from 30 seconds to 1.0 minute, or any range or amount therein in increments of 0.25 seconds.

In some embodiments, the dwell time for a single image can range from 0.10 seconds to 1.0 minutes, from 0.20 seconds to 2.0 minutes, from 0.30 seconds to 1.9 minutes, from 0.40 seconds to 1.8 minutes, from 0.50 seconds to 1.7 minutes, from 0.60 seconds to 1.6 minutes, from 0.60 seconds to 1.5 minutes, from 0.70 seconds to 1.4 minutes, from 0.80 seconds to 1.3 minutes, from 0.90 seconds to 1.2 minutes, from 1.0 seconds to 1.1 minutes, from 0.5 seconds to 5 minutes, or any range or amount therein in increments of 0.1 seconds. In some embodiments, for example, the dwell time can be 0.10 seconds, 0.20 seconds, 0.30 seconds, 0.40 seconds, 0.50 seconds, 0.60 seconds, 0.70 seconds, 0.80 seconds, 0.90 seconds, 1.0 seconds, 1.1 seconds, 1.2 seconds, 1.3 seconds, 1.4 seconds, 1.5 seconds, 1.6 seconds, 1.7 seconds, 1.8 seconds, 1.9 seconds, 2.0 seconds, 2.1 seconds, 2.2 seconds, 2.3 seconds, 2.4 seconds, 2.5 seconds, 2.6 seconds, 2.7 seconds, 2.8 seconds, 2.9 seconds, 3.0 seconds, 3.1 seconds, 3.2 seconds, 3.3 seconds, 3.4 seconds, 3.5 seconds, 3.6 seconds, 3.7 seconds, 3.8 seconds, 3.9 seconds, 4.0 seconds, 4.1 seconds, 4.2 seconds, 4.3 seconds, 4.4 seconds, 4.4 seconds, 4.5 seconds, 4.6 seconds, 4.7 seconds, 4.8 seconds, 4.9 seconds, 5.0 seconds, or in range therein.

As such, the speed can be a scrolling speed. And, the dwell module can also control the acceleration of the speed, such that the acceleration of the scrolling speed can also be controlled. In some embodiments, for example, the response of the movement of the discrete images to the scrolling is linear where the acceleration is zero, and the response of the movement of the discrete images to the scrolling is linear where the acceleration is not zero.

The navigation speed can include consideration the speed images move, for example, in counts per inch (CPI) or dots per inch (DPI). The speed of the movement through the discrete images can be measured in terms of CPI, which is commonly expressed as DPI—the number of steps reported when the screen image moves one inch. If the default condition involves moving one screen-pixel or dot on-screen per reported step, then the CPI equates to DPI: dots of motion per inch of motion. The higher the CPI or DPI, the faster the image currently displayed image changes with scrolling, for example. The dwell module can be adapted to adjust the speed, making the image scroll response time faster or slower than a baseline CPI. And, the dwell module can also be adapted to change the speed dynamically, taking into account the absolute speed and the movement from the last stop-point. The acceleration refers to the setting allowing the user to modify the image acceleration: the change in speed of the image movement over time while the scrolling state selector movement is otherwise constant.

In some embodiments, when the user starts to scroll through images, the dwell module can be adapted to count the number of "counts" or "dots" received and will scroll the image stack by a corresponding number (typically multiplied by a rate factor, which can be less than 1 in some embodiments). The images scroll on the screen, for example, having a good precision. When the movement of the image passes the value set for "threshold", the dwell module can start to scroll the image stack more quickly, changing the rate factor to a higher rate factor. The dwell module is adapted to provide user control, as the user can set the value of the second rate factor by changing the "acceleration" setting. In some embodiments, there are a plurality of scrolling state selectors, and the dwell module can be configured by the user to independently select scrolling speeds and scrolling accelerations that are custom-designed to a particular data-stack, particular user, or a combination thereof. In some embodiments, the speed and/or acceleration of one or more scrolling state selectors can have a default setting, a default setting for a particular data-stack, a default setting for a particular user, or a combination thereof.

One of skill will appreciate that there are numerous types of medical imaging available, and these can be subcategorized, for example, by region of the body, whether or not a contrast material was used, and the like. In some embodiments, the dwell time can be set to correlate to a particular image type or subset of image types, in which the region of the body or image type can affect the desired dwell time. For example, the dwell time and/or acceleration for viewing an X-ray extremity image set can be selected independent of the dwell time for an X-ray abdominal image set. Likewise, the dwell time for an X-ray abdominal image set can be selected independent of the dwell time for an MRI abdominal image set. A person of ordinary skill in the art will be able to select the range of speeds and/or accelerations that should facilitate viewing a particular data-stack.

Example 3. Use of the Teachings Provided Herein to Interpret MRI Images of the Spine This example compares the efficient teachings provided herein with the current state-of-the-art practices in the magnetic resonance imaging (MRI) of the spine.

As currently performed, an MRI of the spine includes acquiring images in two imaging planes, sagittal and axial. The two imaging planes provide complementary information and must be reviewed concurrently to generate an accurate interpretation. As such, a bilateral configuration of monitors linked to a navigation device having a first scrolling state selector and a first indexing state selector linked to the first monitor, and a second scrolling state selector and a second indexing state selector linked to the second monitor, as described herein, would be an efficient arrangement for an efficient review of the images.

Regardless of the viewing arrangement, the spine is reviewed on a level by level basis, and most users generate a short description of each level, then the next level, etc. With current state of the art PACS, this requires several repetitive point-and-click user inputs at each level, the point-click-and-scroll repeated multiple times to generate an accurate assessment of both the spinal canal and neural foramen at each level. As a specific example in the cervical spine, there are 8 levels that need to be described in this fashion. One of skill will appreciated the numerous repetitive mouse inputs required to generate a dictation.

The teachings set-forth herein require much less from the user. The user needs to (i) link to the series of axial images only once to the left platter, which links the scrolling state selector to the series without a need to repetitively point-click-and-scroll; (ii) link to the series of sagittal images only once to the right platter, which likewise links the scrolling state selector to the series without a need to repetitively point-click-and-scroll; and, (iii) touch the platters sequentially to scroll the axial and sagittal image series for an efficient reading in less time, less effort, and less repetitive motions.

Note also that the user no longer has to touch the mouse to complete the dictation after initially setting up the case. Due to the highly repetitive nature of the current state-of-the-art, the teachings provided herein greatly improve efficiency, at least doubling efficiency in many applications.

Example 4. Use of the Teachings Provided Herein to Interpret CT Angiograms of the Aorta and Bilateral Lower Extremities This example compares the efficient teachings provided herein with the current state-of-the-art practices in interpret computerized axial tomography (CT) angiograms of the aorta and bilateral lower extremities.

CT technology has developed new applications, such as CT angiography to replace conventional angiograms with the high resolution of the new technology to depict small vessels with very thin slices and a high number of images to interpret. For example, the number of images can range from about 1000 to about 2000 images per study. One of skill will appreciate that the traditional mouse-based, point-and-click methods of image analysis takes a great deal of time, energy, and effort, not to mention numerous repetitive stresses on the radiologist. Additionally, many images are often added to the study using current techniques in MIP (Maximum Intensity Projection) and 3D reconstructed image generation. These additional images must be reviewed concurrently with the standard load of about 1000 to about 2000 source images, as the reconstructed images give an overview of the anatomy while the source images provide fine detail.

The systems, components, devices, and methods provided herein have been used to reduce the time, energy, effort, and stresses involved in interpreting such a complex study. For example, a single button press can be used to link the left platter with the thin section data set series. And, another button press can be used to link the right platter to the MIP series. This bilateral configuration allows the thin section series to be navigated using the left hand, while the MIP series is navigated with the right hand, allowing for a very rapid cross-correlation of the original and reconstructed data at an efficiency that cannot be realized using state-of-the-art procedures of image interpretation. To perform a similar function conventionally would require using the standard mouse point-and-click methods to alternately select series to correlate, greatly slowing the interpretation time and increasing repetitive motions.

We claim:

1. A navigation system for controlling the speed of viewing of discrete reconstructed images in a video stream, the system comprising:
   a processor;
   a navigation engine operably connected to the processor and on a non-transitory computer readable storage medium for a parsing of the image data for reconstructing discrete images into independently viewable subsets of discrete images that are custom-designed for the video stream, the parsing using criteria that includes
      (i) body part; and,
      (ii) case details selected from the group consisting of age, sex, ethnicity, disease, genomic markers, and other correlating diagnostics;
   a transformation module on a non-transitory computer readable storage medium and configured for
      parsing the images into a preferred subset of images; wherein, the parsing includes altering the preferred subset of images through image enhancement for the video stream;
   a video engine on a non-transitory computer readable storage medium for producing and/or displaying a video stream;
   a database operably connected to the processor and on a non-transitory computer readable storage medium for storing data that is viewed by a user;
   a dwell module operably connected to the processor and on a non-transitory computer readable storage medium for governing the scrolling speed of viewing the video stream; and,
   a navigation device having one or more state selectors configured for controlling viewing speed through the dwell module, the one or more state selectors for a point-free selecting of an independently viewable subset and for the governing of the scrolling speed of viewing;
   wherein,
   the dwell module is configured to establish a set time that must be spent viewing
      the video stream;
      a single reconstructed image in the video stream;
      a subset of reconstructed images in the video stream; and/or,
      a total set of reconstructed images that includes the independently viewable subsets of discrete reconstructed images in the video stream;
      before a viewer of the video stream can scroll or index away, such that the viewer is not free to view the images too fast and overlook image data in the video stream;
   and,
   the set time varies according to the body part and the case details regarding the subject.

2. The system of claim 1, wherein the dwell module is further configured to control the acceleration of the scrolling speed of viewing of the video stream.

3. The system of claim 1, wherein the dwell module includes gaze technology to initiate a timed scrolling when the system detects that the user of the system is gazing at the video stream.

4. The system of claim 1, wherein the dwell module includes gaze technology to pause the scrolling speed of viewing when the system detects that the user of the system has looked away from the video stream.

5. The system of claim 4, wherein the dwell module includes gaze technology to resume the scrolling speed of viewing when the system detects that the user of the system is again looking towards the video stream.

6. The system of claim 1, wherein the dwell module includes monitoring how fast the discrete reconstructed images are viewed by the user of the system.

7. The system of claim 1, wherein the dwell module functions to establish a set time that must be spent on a subset of discrete images before the viewer can scroll or index away from the video stream.

8. The system of claim 1, wherein the dwell module functions to establish a set time that must be spent on a single discrete reconstructed image before the viewer can scroll or index away from the video stream.

9. The system of claim 1, wherein the dwell module functions to establish a set time for the total time spent viewing the entire video stream.

10. The system of claim 1, wherein the navigation device includes a scrolling platter and a series of one-click buttons configured as an indexing state selector for a rapid, efficient one-click indexing to sets, subsets, and discrete images.

11. The system of claim 1, wherein the system includes a navigation device includes a first scrolling platter and a first series of one-click buttons that correspond to a first video display; and, a second scrolling platter and a second series of one-click buttons that correspond to a second video display, the first series of one-click buttons and second series of one-click buttons configured as indexing state selectors for a rapid, efficient one-click indexing to sets, subsets, and discrete images.

12. A method of rapid analyzing image data using the system of claim 1, the method comprising:
   storing image data on a database that is operably connected to a processor, the database on a non-transitory computer readable storage medium for storing the data that is viewed by the user;
   viewing the video stream on a first video display and controlling viewing speed of the video stream with the dwell module.

13. The method of claim 12, wherein the viewing of the video stream includes controlling an acceleration of the scrolling speed of the viewing of the video stream with the dwell module.

14. The method of claim 12, wherein the viewing of the video stream includes initiating a timed scrolling with a gaze technology when the system detects that the user of the system is gazing at the video stream.

15. The method of claim 12, wherein the viewing of the video stream includes pausing the scrolling speed of viewing with a gaze technology when the system detects that the user of the system has looked away from the video stream.

16. The method of claim 12, wherein the viewing of the video stream includes resuming the scrolling speed of viewing with a gaze technology when the system detects that the user of the system is again looking towards the video stream.

17. The method of claim 12, wherein the viewing of the video stream includes establishing a set time that must be spent on viewing a subset of discrete reconstructed images before the viewer can scroll or index away from the video stream.

18. The method of claim 12, wherein the viewing of the video stream includes establishing a set time that must be spent on a single discrete reconstructed image before the viewer can scroll or index away from the video stream.

19. The method of claim 12, wherein the viewing of the video stream includes establishing a set time for the total time spent viewing the entire video stream.

\* \* \* \* \*